US012633151B2

(12) United States Patent
Rezaeian et al.

(10) Patent No.: US 12,633,151 B2
(45) Date of Patent: May 19, 2026

(54) ANOMALOUS EVENT PREDICTION USING CONTRASTIVE LEARNING

(71) Applicant: Oracle International Corporation, Redwood Shores, CA (US)

(72) Inventors: Amir Hossein Rezaeian, San Mateo, CA (US); Alberto Polleri, London (GB)

(73) Assignee: Oracle International Corporation, Redwood Shores, CA (US)

( * ) Notice: Subject to any disclaimer, the term of this patent is extended or adjusted under 35 U.S.C. 154(b) by 970 days.

(21) Appl. No.: 17/654,891

(22) Filed: Mar. 15, 2022

(65) Prior Publication Data

US 2023/0298371 A1     Sep. 21, 2023

(51) Int. Cl.
*G06V 30/413*          (2022.01)
*G06N 3/04*            (2023.01)
                       (Continued)

(52) U.S. Cl.
CPC ........... *G06V 30/413* (2022.01); *G06N 3/045* (2023.01); *G06V 10/774* (2022.01)

(58) Field of Classification Search
CPC ...... G06N 3/044; G06N 3/045; G06N 3/0464; G06N 3/084; G06N 3/0895; G06V 10/774; G06V 30/413
See application file for complete search history.

(56) References Cited

U.S. PATENT DOCUMENTS

| | | | |
|---|---|---|---|
| 9,940,973 B2 * | 4/2018 | Roberts | ................... G11B 27/34 |
| 2016/0253597 A1 * | 9/2016 | Bhatt | ..................... G06N 20/00 |
| | | | 706/12 |

(Continued)

FOREIGN PATENT DOCUMENTS

| | | |
|---|---|---|
| CN | 113222983 | 8/2021 |
| EP | 3847585 | 7/2021 |

OTHER PUBLICATIONS

Majhi, S., Dash, R., Sa, P.K. (2020). Two-Stream CNN Architecture for Anomalous Event Detection in Real World Scenarios. In: Nain, N., Vipparthi, S., Raman, B. (eds) Computer Vision and Image Processing. CVIP 2019. Communications in Computer and Information Science, vol. 1148. Springer, Singapore. (Year: 2020).*
"Concur Detect by Oversight", Available online At: https://www. concur.com/en-us/detect-expense-fraud, Accessed from Internet Dec. 10, 2021, 7 pages.

(Continued)

*Primary Examiner* — Michael J Vanchy, Jr.
(74) *Attorney, Agent, or Firm* — Invoke

(57)          ABSTRACT

Various techniques can include systems and methods for using contrastive learning to predict anomalous events in data processing systems. The method can include accessing an unstructured data file and contextual data associated with the unstructured data file. The method can also include generating an event-data input element for the unstructured data file. The event-data input element can include a set of feature vectors. The set of feature vectors can include a first feature vector generated by using a first encoder to process the unstructured file and a second feature vector generated by using a second encoder to process the contextual data. The method can also include generating a classification result of the unstructured data file by using a machine-learning model to process the event-data input element, in which the classification result includes a prediction of whether the particular event corresponds to an anomalous event.

25 Claims, 11 Drawing Sheets

(51) Int. Cl.
  *G06N 3/045* (2023.01)
  *G06V 10/774* (2022.01)

(56) References Cited

U.S. PATENT DOCUMENTS

| | | | |
|---|---|---|---|
| 2020/0349169 | A1 | 11/2020 | Venkatesan et al. |
| 2021/0067549 | A1 | 3/2021 | Chen et al. |
| 2021/0334645 | A1* | 10/2021 | Pardeshi ................. G10L 25/51 |
| 2021/0350376 | A1* | 11/2021 | Rosenthal .......... G06Q 20/4016 |
| 2021/0374570 | A1* | 12/2021 | Cheng .................... G06N 3/045 |

OTHER PUBLICATIONS

"Intelligent Audit", Available online At: https://www.concur.com/en-us/travel-expense-audit-service, Accessed from Internet Dec. 10, 2021, 7 pages.
Cho et al., "Masked Contrastive Learning for Anomaly Detection", Available online At: https://arxiv.org/pdf/2105.08793.pdf, May 18, 2021, 14 pages.
Daga , "Using AI to Control Employee Expense Fraud", Available online At: https://avianaglobal.com/using-ai-to-control-employee-expense-fraud/, Accessed from Internet Dec. 10, 2021, 8 pages.
Liu et al., "Anomaly Detection on Attributed Networks via Contrastive Self-Supervised Learning", Institute of Electrical and Electronics Engineers, Transactions on Neural Networks and Learning Systems, Available online At: https://arxiv.org/pdf/2103.00113.pdf, May 6, 2021, 15 pages.
Singhal , "Improving Invoice Anomaly Detection With AI and Machine Learning", Available online At: https://www.ericsson.com/en/blog/2021/1/improving-invoice-anomaly-detection-with-ai-and-machine-learning, Jan. 12, 2021, 7 pages.
International Search Report and Written Opinion for PCT Patent Application No. PCT/US2022/050531, dated Mar. 20, 2023.
Snehashis, Majhi et al., "Two-Stream CNN Architecture for Anomalous Event Detection in Real World Scenarios", 4th International Conference, CVIP 2019, Jaipur, India, Sep. 27, 2019.
Tack, J. et al. "CSI: Novelty Detection via Contrastive Learning on Distributionally Shifted Instances", Arxiv.org, Cornell University, Oct. 21, 2020.

* cited by examiner

300

304

302

Data Augmentation

308

306

310

First Encoder

316

First Feature Space

314

Vector β

312

Vector α

318

Loss Determination

320

Adjust parameters

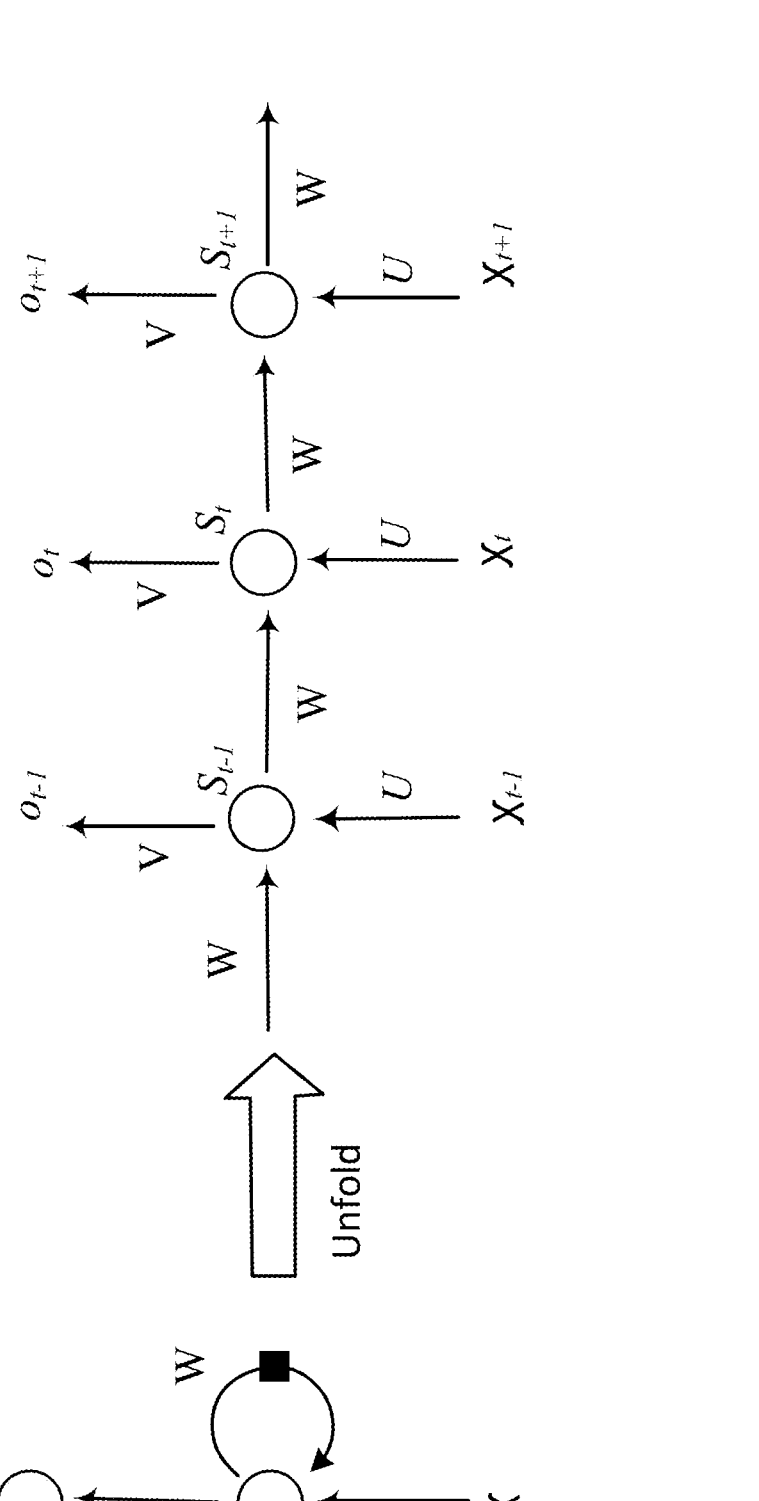
*FIG. 4*

800

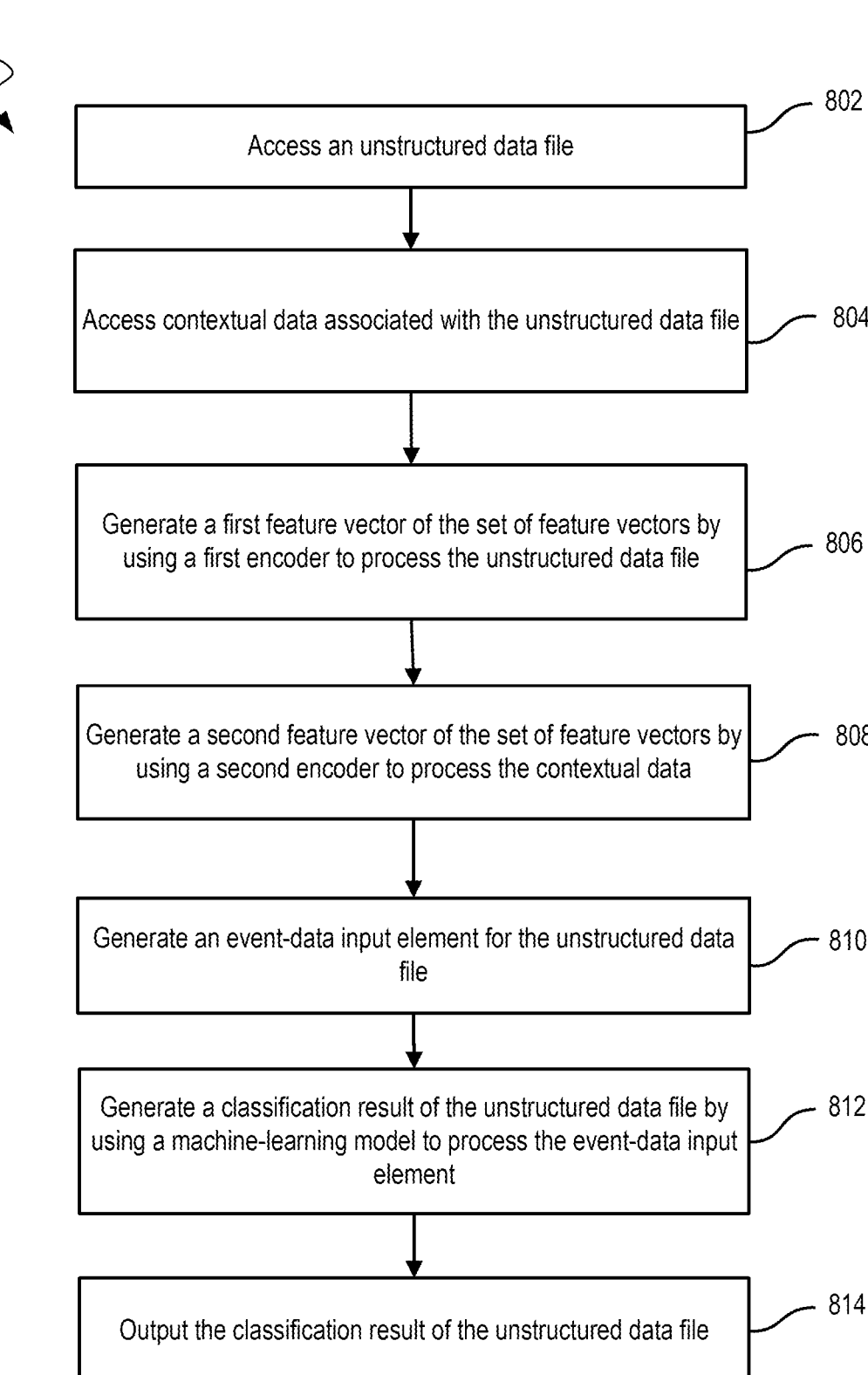

802 — Access an unstructured data file

804 — Access contextual data associated with the unstructured data file

806 — Generate a first feature vector of the set of feature vectors by using a first encoder to process the unstructured data file 808 — Generate a second feature vector of the set of feature vectors by using a second encoder to process the contextual data 810 — Generate an event-data input element for the unstructured data file 812 — Generate a classification result of the unstructured data file by using a machine-learning model to process the event-data input element 814 — Output the classification result of the unstructured data file

*FIG. 8*

ANOMALOUS EVENT PREDICTION USING CONTRASTIVE LEARNING

TECHNICAL FIELD

The present disclosure relates generally to predicting anomalous events in data processing systems, and more particularly, to techniques for using contrastive learning to predict anomalous events in data processing systems.

BACKGROUND

An anomalous event can refer to an event that is not associated with any existing categories or classifications that are already recognized by a system. The anomalous event (e.g., an unrecognizable transaction) can be predicted based on various factors, such as location and time at which the event occurred, information about an entity who triggered the event, and content of communications exchanged during the event. Predicting anomalous events using existing machine-learning techniques, however, can be challenging. The existing machine-learning techniques can include training a machine-learning model using training data that are identified by their corresponding training labels. In the event that various types of anomalous events exist in a given domain, the training labels may not represent all those types of anomalous events. In effect, prediction accuracy of the machine-learning model can be sub-optimal.

SUMMARY

In some embodiments, systems and methods are provided to using contrastive learning to predict anomalous events in data processing systems. The method can include accessing an unstructured data file. The unstructured data file can identify an occurrence of a particular event. The method can also include accessing contextual data associated with the unstructured data file. The contextual data can include information that describe an environment at which the particular event occurred.

The method can also include generating an event-data input element for the unstructured data file. The event-data input element can include a set of feature vectors. The event-data input element can be generated by: (1) generating a first feature vector of the set of feature vectors by using a first encoder to process the unstructured data file; and (2) generating a second feature vector of the set of feature vectors by using a second encoder to process the contextual data. In some instances, the first feature vector represents the unstructured data file in a first feature space, and the second feature vector represents the contextual data in a second feature space.

One or more parameters of the first encoder and the one or more parameters of the second encoder can be learned by: (i) transforming a first training feature vector at the first feature space to generate a first training transformed feature vector that represents a training unstructured data file in a shared feature space, in which the training unstructured data file identifies a training event; (ii) transforming a second training feature vector at the second feature space to generate a second training transformed feature vector that represents a training contextual data in the shared feature space, in which the training contextual data identifies the same training event; and (iii) generating a vector in the shared feature space based on the first training transformed feature vector and the second training transformed feature vector. The generating of the vector can include combining information from the first training transformed feature vector and the second training transformed feature vector to result in the vector with improved projected predictiveness over either the first training feature vector or the second training feature vector in isolation.

The method can also include generating a classification result of the unstructured data file by using a machine-learning model to process the event-data input element. The classification result can include a prediction of whether the particular event corresponds to an anomalous event. The method can also include outputting the classification result of the unstructured data file.

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes disclosed herein. Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The foregoing, together with other features and embodiments will become more apparent upon referring to the following specification, claims, and accompanying drawings.

BRIEF DESCRIPTION OF THE DRAWINGS

FIG. 4 depicts an example schematic diagram of a recurrent neural network, according to some embodiments.

FIG. 8 includes a flowchart illustrating an example of a method of for predicting anomalous events using contrastive learning, according to some embodiments.

Like reference, symbols in the various drawings indicate like elements, in accordance with certain example implementations. In addition, multiple instances of an element may be indicated by following a first number for the element with a letter or a hyphen and a second number.

DETAILED DESCRIPTION

I. Overview

Figure 1:
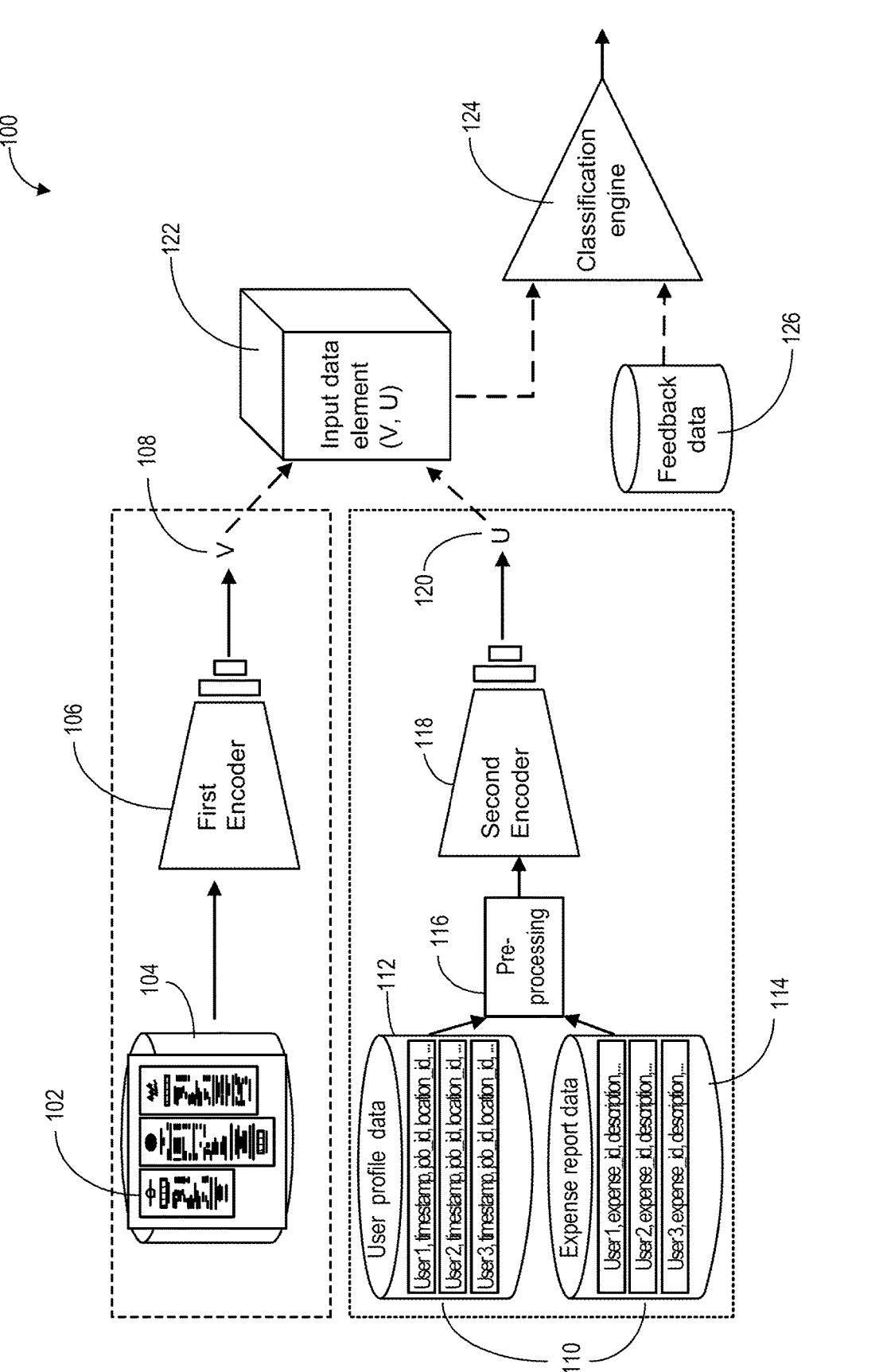
FIG. 1 illustrates an example computing environment for anomalous event prediction using contrastive learning, according to some embodiments.

Specific details are given in the following description to provide a thorough understanding of the embodiments. However, it will be understood that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart or diagram may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The ensuing description provides preferred exemplary embodiments only, and is not intended to limit the scope, applicability or configuration of the disclosure. Rather, the ensuing description of the preferred exemplary embodiments will provide those skilled in the art with an enabling description for implementing various embodiments. It is understood that various changes may be made in the function and arrangement of elements without departing from the spirit and scope as set forth in the appended claims.

Specific details are given in the following description to provide a thorough understanding of the embodiments. However, it will be understood that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart or diagram may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

Techniques, systems, and methods are provided for predicting anomalous events using contrastive learning. Contrastive learning is a self-supervised machine-learning technique, in which a machine-learning model can be trained using training data that are neither labeled nor annotated. For each training element in the training data, data augmentation can be applied generate a "similar" training element by applying a transformation. Then, an encoder can be trained to generate a feature vector for each individual training element, where a loss is defined so as to penalize instances where locations of feature vectors of similar training elements are far apart in a given feature space and/or instances where locations of feature vectors of different training elements are close together in a given feature space. The trained encoder can then be used to generate a feature vector for each of one or more non-training data elements, and it can be determined whether each individual training data element represents an anomalous event based on a loss between the particular feature vector and each of the existing feature vectors. Contrastive learning can be advantageous in that various types of anomalous events can be predicted, while reducing the additional need for generating target labels for training the machine-learning model.

An anomalous-event prediction system can access an unstructured data file identifying an occurrence of a particular event. The anomalous-event prediction system can be a computer server that communicates with other systems and/or client devices in the same or different communication network to access the unstructured data file. The unstructured data file can include unstructured data. The unstructured data can include information that either does not have a pre-defined data model or is not organized in a pre-defined manner. The unstructured data file can correspond to a particular file format, such as email file format, image file format, web page format, document file format, audio file format, video file format, and other types of file formats that can be contemplated by a person ordinarily skilled in the art.

The anomalous-event prediction system can then parse or otherwise analyze content from the unstructured data file to identify the occurrence of the particular event. In some instances, the anomalous-event prediction system extracts text data by processing an image using optical character recognition, in which the text data identifies the occurrence of the particular event. The particular event can be any type of an event that identifies one or more actions involving an entity (e.g., an employee of an organization). For example, the particular event can be a purchase of a particular item by the entity, and the unstructured data file can be an image of a receipt associated with such purchase. In another example, the particular event can identify an occurrence of a phone conversation between the entity and another entity, and the unstructured data file can be a voice recording of such phone conversation.

The anomalous-event prediction system can also access contextual data associated with the unstructured data file. The contextual data include any information that describe an environment at which the particular event occurred. The contextual data can include unstructured data, including unstructured text. In some instances, the contextual data include structured data formatted in accordance with a corresponding database schema or a document object model. The contextual data can be used with the unstructured data to further enhance accuracy of the machine-learning model, as the contextual data provide additional data points that can be relevant for predicting the anomalous events. The contextual data can also facilitate prediction of the anomalous events without requiring target labels to be generated for training data (e.g., a training unstructured data file). The anomalous-event prediction system can access the contextual data from one or more data stores, including a user-profile data store that stores user-profile data of the entity that was involved in the particular event. The contextual data can include, but are not limited to, the following information that can be accessed by the anomalous-event detection system: (i) a location at which the particular event occurred; (ii) an entity who was involved in the particular event; (iii) another preceding or ensuing event that is predicted to be relevant to the particular event; and/or (iv) a type or category associated with a transaction associated with the particular event.

The anomalous-event prediction system can then generate an event-data input element. The event-data input element can be a data structure (e.g., a tuple) that includes a set of feature vectors that can be used to predict whether the particular event corresponds to an anomalous event. The anomalous-event prediction system can generate the set of feature vectors of the event-data input element by using one or more machine-learning models to process the unstructured data file and the contextual data.

In some embodiments, the anomalous-event prediction system generates a first feature vector that represents the unstructured data file in a first feature space by processing the unstructured data file using a first encoder. An encoder can include a machine-learning model that processes an input to generate a feature vector that can be represented in a corresponding feature space. In some instances, the first encoder is a convolutional neural network or a multi-layer perceptron neural network. As used herein, the feature vector refers to an n-dimensional vector of values that collectively represent an object. The feature space can be an n-dimensional space at which the feature vector can be identified by its corresponding location. For example, the first feature vector can be an n-dimensional vector that includes a set of values that represents the unstructured data file, in which each value of the set identifies a corresponding location of the first feature vector at a dimension of the first feature space. One or more parameters of the first encoder can be learned based on, within the first feature space, a loss determined between two training feature vectors of a first set of training feature vectors, in which a training feature vector of the first set of training feature vectors can represent a training unstructured data file that is the same or similar to that of another training feature vector of the first set. Thus, the training of the first encoder can facilitate identification of characteristics of the unstructured data file, based on a loss determined between the first feature vector and each of the first set of training feature vectors. In some instances, the first encoder includes a first contrastive loss function for determining the loss, at which the loss can be used to adjust the one or more parameters of the first encoder.

The anomalous-event prediction system can also generate a second feature vector that represents the contextual data in a second feature space by processing contextual data using a second encoder. The second feature vector can be an n-dimensional vector that includes a set of values that represent the contextual data, in which each value of the set identifies a corresponding location of the second feature vector at a dimension of the second feature space. The second encoder can have an architecture that is the same or different from that of the first encoder. Each of the first and second encoders can thus be trained to generate the feature vectors in their respective feature spaces, and the first and second encoders may not share any parameters. One or more parameters of the second encoder can be learned based on, within the second feature space, another loss determined between two training feature vectors of a second set of training feature vectors, in which a training feature vector of the second set of training feature vectors can represent training contextual data that is the same or similar to that of another training feature vector of the second set. Thus, the training of the second encoder can facilitate identification of characteristics of the contextual data, based on a loss between the second feature vector and each of the first set of training feature vectors. The second encoder can include a second contrastive loss function that can be used to determine the other loss between two training feature vectors of a second set of training feature vectors, at which the other loss can be used to adjust the one or more parameters of the second encoder.

However, using separate feature spaces for each feature vector may cause various issues. For example, several feature vectors may be considered "similar" in the respective feature space, not because they correspond to similar events but share tangential characteristics (e.g., similar store of purchase, similar date and time). To ensure that the first and second feature vectors represent the same particular event in their respective feature spaces, a shared feature space can be implemented. Training of the first and second encoders can be additionally performed based on, in the shared feature space, a loss determined between two training feature vectors that identify the same event. The contrastive learning of the first and second encoders in the shared feature space can reduce overfitting of the feature vectors that rely on the tangential characteristics. In addition, the contrastive learning in the shared feature space can facilitate a prediction of a particular data item (e.g., the unstructured data file, the contextual data) that is indicative of the anomalous event.

In some embodiments, the one or more parameters of the first encoder and the one or more parameters of the second encoder were further learned to generate a vector in the shared feature space based on a first training transformed feature vector and a second training transformed feature vector. The vector can be generated by combining information from the first training transformed feature vector and the second training transformed feature vector to result in the vector with improved projected predictiveness over either the first training feature vector or the second training feature vector in isolation. The first training transformed feature vector can be generated by applying a first projection function to a first training feature vector that represents a training unstructured data file identifying a training event. Similarly, the second training transformed feature vector can be generated by applying a second projection function to a second training feature vector that represents a training contextual data identifying the same training event. In some instances, the first contrastive loss function and the second contrastive loss function are combined and weighted by one or more weighting factors, such that the combined loss function can be used to determine a loss. The determined loss can then be used to adjust the respective parameters of the first and second encoders. A weighting factor can be a hyperparameter that can be tuned during the training of the first and second encoders. Thus, the contrastive learning of the first and second encoders can ensure that the feature vectors associated with the unstructured data file and the contextual data correspond to the same particular event, based on the loss determined within the shared feature space.

The anomalous-event prediction system can generate a classification result by processing the event-data input element using a machine-learning model. The classification result includes a prediction of whether the particular event corresponds to an anomalous event. In some instances, the machine-learning model is a neural-network or tree-based classifier model. The classification result can also include a severity score of the anomalous event with a confidence interval. The severity score can be predictive of whether the particular event corresponds to a particular type of the anomalous event that requires a subsequent action (e.g., auditing). The severity score can be then used to categorize or cluster predicted anomalous events. For example, the anomalous events can be clustered to rank the anomalous events based on the predicted severity scores. The downstream pipeline tasks can use this information for subsequent actions. The anomalous-event prediction system can thereby anticipate various types of anomalous events, even when the encoders and the machine-learning model were trained without labeled training data. In some instances, the anomalous-event prediction system further processes feedback data to enhance accuracy of the machine-learning model to predict the classification result. In some instances, the feedback data is used to adjust values of the first feature vector and/or the second feature vector. The anomalous-event prediction system can output the classification result. The outputted classification result can be used by another data processing system to perform a subsequent action to initiate an auditing process of the particular event identified in the unstructured data file. In some instances, the other data processing system uses the outputted classification result to deny or otherwise suspend further processing of the unstructured data file.

II. Computing Environment for Anomalous Event Prediction using Contrastive Learning FIG. 1 illustrates an example computing environment for anomalous event prediction using contrastive learning, according to some embodiments. The computing environment can include an anomalous-event prediction system 100 that performs one or more operations to predict whether a particular event identified in an unstructured data file corresponds to an anomalous event. The anomalous-event prediction system 100 can be a computer server that communicates with other systems and/or client devices to access the unstructured data file.

As an illustrative example, the anomalous-event prediction system 100 can interact or otherwise communicate with an Enterprise Resource Planning (ERP) expense auditing system. The ERP system can access data associated with a purchase of flash memory devices from various sources of data. An example source of data can be an image repository that stores a plurality of receipt images. Another example source of data can be a document repository that stores a plurality of scanned purchase orders. The ERP system can thus process the accessed data to determine whether to approve, reject, or further process the purchase of flash memory devices.

The anomalous-event prediction system 100 can access an unstructured data file 102. The unstructured data file 102 can include unstructured data. The unstructured data can include information that either does not have a pre-defined data model or is not organized in a pre-defined manner. The unstructured data file 102 can correspond to a particular file format, including email file format (e.g., MSG), image file format (e.g., JPG, JPEG, PNG, BMP), web page format (e.g., HTML), document file format (e.g., DOC, PDF, XPS, EPUB), audio file format (e.g., MP3, M4A), video file format (e.g., MPEG, MOV), and other types of file formats that can be contemplated by a person ordinarily skilled in the art. Continuing with the example, the unstructured data file 102 can be a receipt image file that identifies the purchase of flash memory devices by an entity. The anomalous-event detect system can access the receipt image from other receipt images that are stored in an image repository 104.

The anomalous-event prediction system 100 can parse or otherwise analyze content from the unstructured data file to identify the occurrence of a particular event. Continuing with the above example, the anomalous-event prediction system 100 can extract text data by processing the unstructured data file 102 using optical character recognition. The text data can identify the occurrence of the purchase, including a location of the purchase, time and date of the purchase, and payment information used to purchase the flash memory devices.

A first encoder 106 of the anomalous-event prediction system 100 can generate a first feature vector 108 that represents the unstructured data file 102 in a first feature space. The first encoder 106 can include a first encoder that processes the unstructured data file 102 to generate the first feature vector 108. The first encoder 106 can be trained to generate the feature vector 108 for the unstructured data file 102, where a loss is defined so as to penalize instances where locations of feature vectors of similar training elements (e.g., training unstructured data files) are far apart in the first feature space and/or instances where locations of feature vectors of different training elements are close together in the first feature space.

The first encoder 106 can be a convolutional neural network or a multi-layer perceptron neural network. The first feature vector 108 can be an n-dimensional vector that includes a set of values that represents the unstructured data file 102, in which each value of the set identifies a corresponding location of the first feature vector 108 at a dimension of the first feature space. The first encoder can be trained to facilitate identification of characteristics of the unstructured data file 102, based on a loss between the first feature vector 108 and each of a first set of training feature vectors in the first feature space. Continuing with the above example, the first encoder 106 can be a convolutional neural network that generates first feature vector 108 by processing the text data extracted from the unstructured data file 102.

The anomalous-event prediction system 100 can also access contextual data 110 associated with the unstructured data file 102. The contextual data 110 include any information that describe an environment at which the particular event occurred (e.g., a location at which the particular event occurred, another preceding or ensuing event that is predicted to be relevant to the particular event). The contextual data 110 can provide additional data points that can be relevant for processing the unstructured data file 102 to predict the anomalous events.

Continuing with the above example, the contextual data 110 can include one or more data records accessed from a user-profile data store 112, in which the one or more data records identifies the entity who authorized the purchase of flash memory devices. The contextual data 110 can also include one or more data records accessed from an expense-report data store 114, in which the one or more data records include expense reports submitted on behalf of the entity who authorized the purchase of flash memory devices. In some embodiments, the data records accessed from the user-profile data store 112 include information (e.g., an entity identifier) that can also be identified in the data records accessed from the expense-report data store 114.

In some instances, the contextual data 110 include structured data formatted in accordance with a corresponding database schema or a document object model. For example, the contextual data 110 can be formatted in accordance with an SQL database schema of the user-profile data store 112, in which the schema defines one or more data fields such as "user_id", "timestamp", "job_id", "location_id", "role_id", "duty_id", "privilege_id", and "assignment_id". In another example, the contextual data 110 can be formatted in accordance with an XML document object model of the expense-report data store 114, in which the document object model defines one or more data fields such as "user_id", "expense_id", and "description", "justification", "expense_type", and "expense_category".

In some instances, the contextual data 110 is further processed by a pre-processing module 116 of the anomalous-event prediction system 100. The pre-processing module 116 can apply one or more data manipulations (e.g., normalization, filtering) to the contextual data 110, to enhance performance of encoders that process the contextual data 110. For example, the pre-processing module 116 can include a flattening operation that processes the contextual data 110 by merging data records accessed from one or more data stores (e.g., the user-profile data store 112, the expense-report data store 114) into a single or reduced number of table and removing any redundant data. Continuing with the above example, the pre-processed contextual data 110 can include information that merges the data records from the user-profile data store 112 and the expense-report data store 114. The information from the merged data records can be defined by a different database schema that includes one or more data fields such as "user_id", "timestamp", "job_id", "location_id", "role_id", "duty_id", "privilege_id", "assignment_id", "expense_id", and "description", "justification", "expense_type", and "expense_category".

A second encoder 118 of the anomalous-event prediction system 100 can generate a second feature vector 120 that represents the contextual data 110 in a second feature space by processing the contextual data 110. The second encoder 118 can be trained to generate the feature vector 120 for the contextual data 110, where another loss is defined so as to penalize instances where locations of feature vectors of similar training elements (e.g., training contextual data) are far apart in the second feature space and/or instances where locations of feature vectors of different training elements are close together in a the second feature space. Thus, the training of the second encoder 118 can facilitate identification of characteristics of the contextual data 110, based on a loss between the second feature vector 120 and each of the first set of training feature vectors.

The second encoder 118 can be a convolutional neural network or a multi-layer perceptron neural network. The second encoder 118 can have an architecture that is the same or different from that of the first encoder 106. Each of the first and second encoders 106 and 118 can thus be trained to generate the feature vectors 108 and 120 in their respective feature spaces, in which the first and second encoders 106 and 118 may not share any parameters.

The second feature vector 120 can be an n-dimensional vector that includes a set of values that represents the contextual data 110, in which each value of the set identifies a corresponding location of the second feature vector 120 at a dimension of the second feature space. The second encoder 118 can be trained to facilitate identification of characteristics of the contextual data 110, based on a loss between the second feature vector 120 and each of a first set of training feature vectors in the second feature space. Continuing with the above example, the second encoder 118 can be a multi-layer perceptron neural network that generates second feature vector 120 by processing the pre-processed contextual data 110.

The first and second encoders 106 and 118 can be further trained such that the first and second feature vectors 108 and 120 represent the same particular event in their respective feature spaces. For example, the first and second encoders 106 and 118 can be further trained by generating their respective vectors on a shared feature space. Training of the first and second encoders 106 and 118 can be additionally performed based on, in the shared feature space, a loss between two training feature vectors that identify the same event. In some instances, the training includes generating a vector in the shared feature space based on: (i) a first training transformed feature vector generated by applying a first projection function to the first feature vector 108; and (ii) a second training transformed feature vector generated by applying a second projection function to the second feature vector 110. The vector can be generated by combining information from the first training transformed feature vector and the second training transformed feature vector to result in the vector with improved projected predictiveness over either the first training feature vector or the second training feature vector in isolation. The contrastive learning of the first and second encoders in the shared feature space can reduce overfitting of the feature vectors that rely on the tangential characteristics. Thus, the contrastive learning of the first and second encoders 106 and 118 can ensure that the feature vectors associated with the unstructured data file 102 and the contextual data 110 correspond to the same event (e.g., purchase of flash memory devices).

The anomalous-event prediction system 100 can generate an event-data input element 122 of the unstructured data file 102, based on the first and second feature vectors 108 and 120. The event-data input element 122 of the unstructured data file 102 can be a data structure (e.g., a tuple) that includes at least the first and second feature vectors 108 and 120 that can be processed by a machine-learning model (e.g., a classifier model) to predict whether the particular event identified in the unstructured data file 102 corresponds to an anomalous event. Continuing with the example, the event-data input element 122 can be identified by a tuple defined by "event(u, v)", in which: (1) the variable name "event" identifies that the event-data input element corresponds to the unstructured data file 102; (2) the "u" represents the first feature vector 108; and (3) the "v" represents the second feature vector 120. Thus, the first and second feature vectors 108 and 120 of the event-data input element 122 can represent one or more characteristics associated with the particular event associated with the unstructured data file 102 (e.g., the purchase of the flash memory devices).

A classification engine 124 can be configured to process the event-data input element 122 using another machine-learning model to generate a classification result. The classification result can include a prediction of whether the particular event identified in the unstructured data file 102 corresponds to an anomalous event. The classification result can also include a severity score of the anomalous event with a confidence interval. The severity score can be then used to categorize or cluster predicted anomalous events. For example, the anomalous events can be clustered to rank the anomalous events based on the predicted severity scores. The downstream pipeline tasks can use this information for subsequent actions. In some instances, the machine-learning model is a neural-network or tree-based classifier model.

In some instances, the machine-learning model of the classification engine 124 additionally processes feedback data 126 to enhance accuracy of the machine-learning model of the classification engine 124 to predict the classification result. In some instances, the feedback data 126 includes data manually inputted by another user, in response to the anomalous-event prediction system 100 predicts that one of the first feature vector 108 and second feature vector 120 deviates from an expected vector value. For example, a first deviation from a first expected vector value of the first feature vector can be predicted based on: (1) generating a distribution of the training first feature vectors of the first feature space; (2) determining that the first feature vector corresponds to an outlier of the generated distribution; and (3) determining that the first feature vector deviates from the expected vector value.

The classification engine 124 can output the classification result. The outputted classification result can be used by another data processing system to perform a subsequent action to initiate an auditing process of the particular event identified in the unstructured data file 102. For example, an auditing system can perform a review of the purchase of the flash memory device, to determine whether such purchase was an authorized transaction. In some instances, the other data processing system uses the outputted classification result to deny or otherwise suspend further processing of the unstructured data file 102.

III. Training Techniques for Anomalous Event Prediction

Training machine-learning models for predicting anomalous events can include two processes: (1) training one or more encoders to generate an event-data input element that represents a given unstructured data file; and (2) training another machine-learning model to predict whether a particular event identified in the unstructured data file corresponds to an anomalous event. With respect to the first stage, the one or more encoders can be trained to generate their respective feature vectors that encode one or more characteristics associated with a particular event identified in an unstructured data file (e.g., an image receipt, a video file). Each of the encoders can be trained using unsupervised learning, in which the training data are not labeled or annotated. Each of the encoders can be trained using training data from a corresponding data source (e.g., image repository, user-profile data stores). The feature vectors can be used to generate an event-data input element.

With respect to the second stage, the machine-learning model can be trained to process the event-data input element to generate a classification result. The classification result includes a prediction as to whether the particular event corresponds to an anomalous event. In some instances, the training of the machine-learning model includes appending the event-data input element with feedback data to enhance prediction accuracy of the other machine-learning model.

The encoders and the machine-learning models can be trained using different types of training data to predict anomalous events in various domains. For example, the encoders and the machine-learning models can be trained using receipt images and expense reports to predict anomalous events for an expense-auditing system. In another example, the encoders and the machine-learning models can be trained using sensor data (e.g., text, voice, images) to predict anomalous events for a video surveillance system. Other examples can include: (1) training the encoders and the machine-learning models using voice recordings to predict anomalous events for a call-center system; and (2) training the encoders and the machine-learning models using email files to predict anomalous events for a customer-support system.

A. First Encoder for Processing Unstructured Data Files

The first encoder can be trained using unlabeled training data to process a particular unstructured data file and generate a feature vector. The feature vector can represent the unstructured data file in a first feature space. For example, the first feature vector can be an n-dimensional vector that includes a set of values that represents the particular unstructured data file, in which each value of the set identifies a corresponding location of the first feature vector at a dimension of the first feature space. The first feature vector generated by the trained first encoder can encode or otherwise represent one or more characteristics associated with a particular event identified in the unstructured data file.

1. Training Data

In some embodiments, training data for the first encoder includes a first training set of unstructured data files. Each unstructured data file of the first training set can include unstructured data, which include information that either does not have a pre-defined data model or is not organized in a pre-defined manner. In some instances, each unstructured data file of the first training set does not include any training labels or annotations. Thus, the training process of the first encoder includes training the first encoder using the unlabeled training data.

The unstructured data files of the first training set can correspond to a particular file format, including email file format (e.g., MSG), image file format (e.g., JPG, JPEG, PNG, BMP), web page format (e.g., HTML), document file format (e.g., DOC, PDF, XPS, EPUB), audio file format (e.g., MP3, M4A), video file format (e.g., MPEG, MOV), and other types of file formats that can be contemplated by a person ordinarily skilled in the art. Based on the file format, one or more data pre-processing can be performed for each unstructured data file of the first training set. For example, if unstructured data files of the first training set correspond to a voice-recording file format, a speech-to-text algorithm can be applied to each unstructured data file of the first training set to convert the audio data into text data. In another example, if unstructured data files of the first training set correspond to a video file format, a video-frame extraction algorithm can be applied to each unstructured data file of the first training set to generate image data from the video data.

Each unstructured data file of the first training set can identify an occurrence of a corresponding event for a particular domain. For example, an unstructured data file of the first training set for the expense-reporting domain can identify a subscription of an entity to a network monitoring service. In another example, an unstructured data file of the first training set for the video-surveillance domain can identify an appearance of one or more objects from the video file.

2. Machine-Learning Model Selection

One or more machine-learning models of the first encoder can then be selected for training. A machine-learning model of the first encoder can be a convolutional neural network, an inception neural network, a residual neural network, a recurrent neural network, long short-term memory models, gated recurrent units models, or other variants of Deep Neural Networks. The machine-learning model can also be any other suitable model that can be trained to generate feature vectors from unstructured data files, such as a Naive Bayes Classifier, Linear Classifier, Support Vector Machine, Bagging Models such as Random Forest Model, Boosting Models, Shallow Neural Networks, or combinations of one or more of such techniques—e.g., Multi-Scale Convolutional Neural Network. In some instances, the first encoder has a Siamese network architecture, in which the machine-learning model is trained twice in each iteration to penalize instances where locations of similar training feature vectors are far apart in the first feature space and instances where locations of different training feature vectors are close together in the first feature space.

Figure 2:
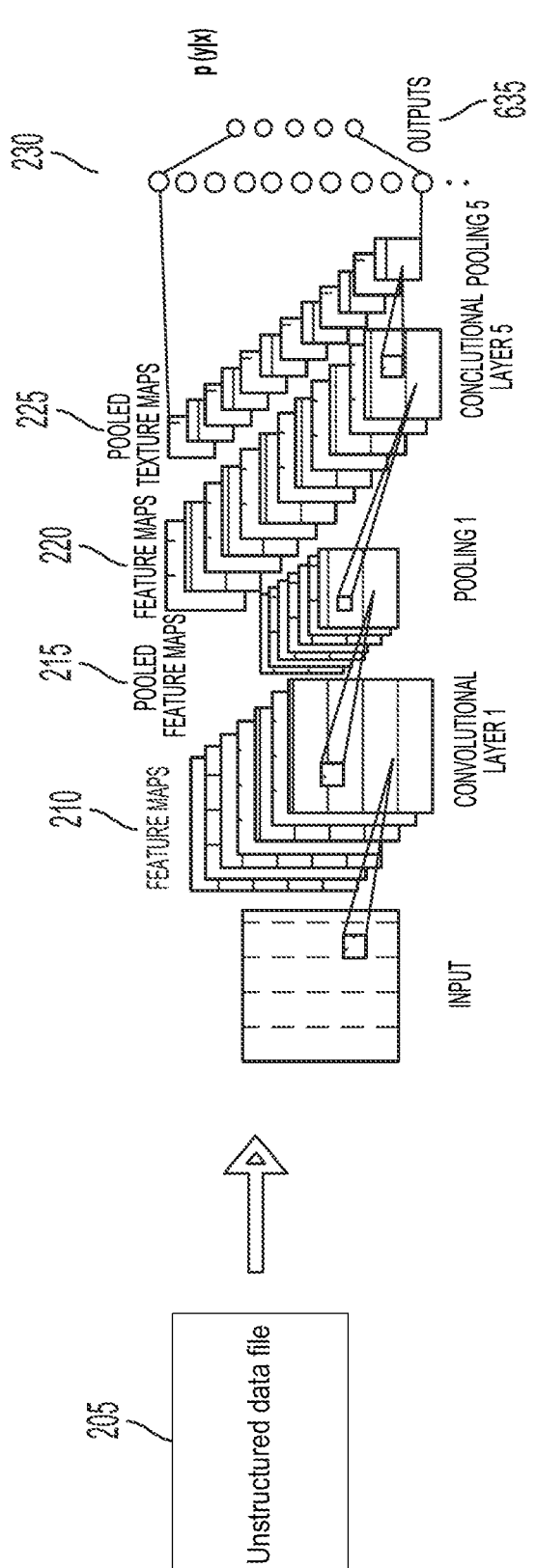
FIG. 2 illustrates an example schematic diagram for using convolutional neural networks to generate a feature vector of an unstructured file, in accordance with some embodiments.

The first encoder can include a convolutional neural network. FIG. 2 illustrates an example schematic diagram 200 for using convolutional neural networks to generate a feature vector of an unstructured file, in accordance with some embodiments. For illustrative purposes, the process implemented in the schematic diagram 200 is described with reference to the components illustrated in FIG. 1, though other implementations are possible. For example, program code for the first encoder 106 of FIG. 1, which is stored in a non-transitory computer-readable medium, is executed by one or more processing devices to cause the devices to perform operations described herein.

An unstructured data file 205 can be provided to the first encoder configured to apply one or more layers of a deep convolutional neural network model. The unstructured data file 205 may be an image file of a receipt that can be represented by a set of pixels, in which each pixel includes a set of color values (e.g., RGB values). In some instances, color value corresponding to a given pixel is associated with (for example) a general intensity value and/or an intensity value as it pertains to each of one or more colors.

The first encoder can perform a series of operations on the pixel values corresponding to the unstructured data file 205, which form a single convolutional layer for several types of convolutional neural network architectures: (1) convolution; (2) non-linearity conversion (e.g., ReLU); (3) pooling or sub sampling; and (4) fully connected layer. In some instances, convolution operation of the first encoder preserves the spatial relationship between pixels by learning image features using small squares of input data. For example, the unstructured data file 205 is considered as a matrix of pixel values, in which each pixel area of the matrix can be assigned with values. In addition, the unstructured data file 205 can be a black-and-white image having pixel values ranging from 0 and 1. The unstructured data file 205 may alternatively or additionally include color images that have three assigned RGB values, each of which ranging from 0 and 255.

After the unstructured data file 205 is accessed, the first encoder may generate a feature map 210 based on the unstructured data file 205. In some embodiments, the feature extractor includes one or more kernels or filters including a matrix of values that can "slide over" the matrix corresponding to the unstructured data file 205 so as to generate the feature map 210. For example, a kernel is configured to detect edges, sharpen the image, or identify sets of pixels that represent the subject in order to preprocess the data and provide details that are relevant for image analysis of the classifier. In some instances, a set of hyperparameters that correspond to the feature extraction are predefined (e.g., based on manual input). Feature-extraction hyperparameters may identify (for example) a stride for each filter (e.g., 1-step, 2-step), a padding size, a kernel size, and/or a kernel shape.

Continuing with the example of FIG. 2, the first encoder may perform a non-linearity (e.g., ReLU) conversion which replaces all negative pixel values in the feature map 210 by zero. The ReLU operation of the first encoder may introduce non-linearity in the convolutional neural network model, as the convolution operation generates a linear function output from the matrix values representative of the unstructured data file 205. The non-linearity conversion may additionally or alternatively include using sigmoid function and/or tanh function.

After the ReLU operation, the first encoder can perform a pooling operation on the feature map 210 in order to reduce the spatial size of the feature map 210 and subsequently generate a pooled feature map 215. In some embodiments, pooling reduces the dimensionality of each feature map generated by the kernel of the feature extractor but retains the image-defining features (e.g., edges of an image) captured in the unstructured data file 205. In some instances, the first encoder performs a max pooling operation to access an area within the feature map (e.g., 5×5 matrix within the feature map) and selects the element associated with the highest value. This operation can be iterated to traverse the entirety of the feature map 210, at which the max pooling operation completes the generation of the pooled feature map 215. The first encoder may alternatively or additionally perform an average pooling operation in place of the max pooling operation which selects the sum or average value of the elements captured in the area within the feature map 210. By performing the pooling operations, the first encoder may achieve several technical advantages including capability of generating an input representation of the unstructured data file 205 that allows reduction of number of parameters and computations within the convolutional neural network model, as well scaling of invariant represent of the unstructured data file 205.

Continuing with the example of FIG. 2, the first encoder may continue to apply one or more additional convolutional layers on the unstructured data file 205 at which convolution, ReLU, and pooling operations can be performed on the pooled feature map 215. In some instances, the second convolution layer generates a feature map 220, a pooled feature map 225, and so forth. These operations are repeated until the extracted features become equivariant to the scale and translation of the fully connected layer.

After applying several convolutional layers, the first encoder may apply a fully connected layer 230, which may be a multi-layer perceptron network incorporating a softmax activation function or other types of linear or non-linear functions at an output layer 235. In some embodiments, the first encoder uses the fully connected layer that accesses the extracted features and generates a first feature vector that represents the unstructured data file 205. In some instances, the first feature vector encodes one or more characteristics (e.g., time, location, price) associated with a particular event identified from the unstructured data file 205. The first feature vector can be used to generate an event-data input element that is later processed by another machine-learning model that predicts whether the particular event identified in the unstructured data file 205 corresponds to an anomalous event.

In some instances, the first feature vector includes graph coordinates for identifying a location (e.g., location coordinates) of the unstructured data file in a first feature space. In some instances, an embedding layer is applied to the first feature vector to reduce its dimensionality. For example, the first feature vector can be associated with values having 20 dimensions, at which the embedding layer can reduce the dimensions of the values to 10.

It will be appreciated that, while FIG. 2 depicts using two convolutional layers to process the unstructured data file 205, different numbers of convolutional layers may be used (e.g., which may have an effect of repeating these operations can be repeated by the first encoder one or more times). For example, outputs are determined by applying 10 or more convolutional layers to extract features from the unstructured data file 205. In some embodiments, pooling operations are omitted for one or more convolutional layers applied by the classifier. In some embodiments, different versions of the convolutional neural network model architecture are used by the classifier, including but not limited to AlexNet, ZFNet, GoogLeNet, VGGNet, ResNets, DenseNet, etc.

3. Training of the Machine-Learning Model

After selecting the machine-learning model, the first encoder can be trained using the training data. The first encoder can be trained using contrastive learning to generate the first feature vector that represents the unstructured data file. Thus, contrastive learning allows the first encoder to be trained using training data that are neither labeled nor annotated.

Figure 3:
FIG. 3 illustrates a schematic diagram for training a first encoder using contrastive learning, according to some embodiments.

FIG. 3 illustrates a schematic diagram 300 for training a first encoder using contrastive learning, according to some embodiments. As shown in FIG. 3, the training of the first encoder includes at least the following stages: (1) augmenting a training unstructured data file to generate a first training augmented unstructured data file and a second training augmented unstructured data file; (2) generating a first training feature vector of the first training augmented unstructured data file in a first feature space; (3) generating a second training feature vector of the second training augmented unstructured data file in the first feature space; (4) determining a loss between the first and second training feature vectors; and (5) adjusting one or more parameters of the first encoder based on the determined loss.

The training of the first encoder can be initiated by applying data augmentation 302 to a training unstructured data file 304 of the training data to generate a first augmented training unstructured data file 306 and a second augmented training unstructured data file 308. Data augmentation 302 can include transforming the training unstructured data file 304 to generate two or more modified versions of the training unstructured data file. The data augmentation ensures that the two or more modified versions are "similar" to the training unstructured data file 304.

The modified versions can be used to perform contrastive learning of a first encoder 310. For example, data augmentation of a training image (e.g., a receipt image) can include geometric transformations, flipping, color modification, cropping, rotation, noise injection and random erasing. In another example, data augmentation of a training audio file (e.g., a voice recording of a customer representative) can include noise injection, time shifts, pitch modifications, and playback speed modifications. In yet another example, data augmentation of a training video file can include piecewise affine transform, superpixel processing, Gausian Blur, color inversion, random rotations, random resize, translation, frame additions, frame shifts, flips, downsampling, and upsampling. In FIG. 3, the first augmented training unstructured data file 306 depicts a rotated version of the training unstructured data file 304, and the second augmented training unstructured data file 308 depicts a color-inverted version of the training unstructured data file 304.

The first encoder 310 can process the first augmented training unstructured data file 306 into a first training feature vector 312 in a first feature space 316. The first training feature vector 312 can be an n-dimensional vector of values that collectively represent the first augmented training unstructured data file 306. The first feature space 316 can be an n-dimensional space at which the first training feature vector 312 can be identified by its corresponding location. In some instances, a convolutional neural network of the first encoder is applied to the first augmented training unstructured data file 306 to generate the first training feature vector 312.

The first encoder 310 can also process the second augmented training unstructured data 308 file into a second training feature vector 314 in the first feature space 316. Similar to the first training feature vector 312, the second training feature vector 314 can be an n-dimensional vector of values that collectively represent the second augmented training unstructured data file 308. In some instances, the convolutional neural network of the first encoder 310 is also applied to the second augmented training unstructured data file 308 to generate the second training feature vector. The training of the first encoder can be performed such that first training feature vector 312 and the second training feature vector can both encode the one or more characteristics of the training unstructured data file.

A loss 318 can be determined between the first and second training feature vectors 312 and 314. The determined loss 318 can identify a performance level of the first encoder 310 during the training phase. For example, the determined loss 318 can decrease if the first encoder predicts that the first and second training feature vectors 312 and 314 are similar to each other. Conversely, the determined loss 318 can increase if the first encoder predicts that the first and second training feature vectors 312 and 314 are different from each other. The loss can be determined by: (1) determining a loss (e.g., a cosine similarity, a distance) between the first and second training feature vectors; and (2) applying a first contrastive loss function to the determined loss. In some instances, the first contrastive loss function is a cross-entropy loss function defined to penalize instances where locations of first and second training feature vectors 312 and 314 are far apart in the first feature space 316.

The first encoder can adjust one or more of its parameters 320 based on the determined loss 318. Adjusting the parameters of the first encoder can be performed to minimize, within the first feature space 316, the loss between the first and second training feature vectors. By identifying "similar" unstructured data files without labels or annotations, the training of the first encoder can facilitate identification of characteristics of a particular unstructured data file.

B. Second Encoder for Processing Contextual Data

Similar to the first encoder, the second encoder can be trained using unlabeled training data to process contextual data and generate another feature vector. The other feature vector can represent the contextual data in a second feature space. For example, the second feature vector can be an n-dimensional vector that includes a set of values that represents the contextual data, in which each value of the set identifies a corresponding location of the second feature vector at a dimension of the second feature space. The second feature vector generated by the trained second encoder can thus encode or otherwise represent one or more characteristics associated with the same event identified in a corresponding unstructured data file.

1. Training Data

In some embodiments, training data for the second encoder includes a second training set of contextual-data objects. The contextual data include any information that describe an environment associated with a particular event identified by a corresponding unstructured data file of the first training set. The training contextual-data object can include unstructured data, including unstructured text. In some instances, the contextual-data object of the second training set includes structured data formatted in accordance with a corresponding database schema or a document object model. The contextual-data objects of the second training set provide additional data points that can be used in place of training labels or annotations. The contextual data objects of the second training set can be used to train the second encoder to generate feature vectors in a second feature space. The anomalous-event detection system can use the feature vectors in the second feature space to predict anomalous events without requiring target labels to be generated for training data.

The contextual-data objects of the second training set can be obtained from one or more data stores (e.g., a user-profile data store). The contextual-data objects of the second training set can include, but are not limited to, the following information that can be accessed by the anomalous-event detection system: (i) a location at which the particular event occurred; (ii) an entity who was involved in the particular event; (iii) another preceding or ensuing event that is predicted to be relevant to the particular event; and/or (iv) a type or category associated with a transaction associated with the particular event.

2. Machine-Learning Model Selection

One or more machine-learning models of the second encoder can then be selected for training. Similar to the first encoder, a machine-learning model of the second encoder can be a convolutional neural network, an inception neural network, a residual neural network, a recurrent neural network, long short-term memory models, gated recurrent units models, or other variants of Deep Neural Networks. The machine-learning model can also be any other suitable model that can be trained to generate feature vectors from unstructured data files, such as a Naive Bayes Classifier, Linear Classifier, Support Vector Machine, Bagging Models such as Random Forest Model, Boosting Models, Shallow Neural Networks, or combinations of one or more of such techniques—e.g., Multi-Scale Convolutional Neural Network. In some instances, the second encoder has a Siamese network architecture, in which the machine-learning model is trained twice in each iteration to penalize instances where locations of similar training feature vectors are far apart in the second feature space and instances where locations of different training feature vectors are close together in the second feature space.

In some instances, the second encoder has an architecture that is the same or different from that of the first encoder. Each of the first and second encoders can thus be trained to generate the feature vectors in their respective feature spaces, in which the first and second encoders may not share any parameters.

The second encoder can be a convolutional neural network or a multi-layer perceptron neural network. In some instances, the second encoder is a recurrent neural network. FIG. 4 depicts an example schematic diagram 400 of a recurrent neural network, according to some embodiments. The recurrent neural networks include a chain of repeating modules ("cell") of a neural network. Specifically, an operation of the recurrent neural network includes repeating a single cell indexed by a position of a text section (t) within the text sections of the contextual data object. In order to provide its recurrent behavior, a recurrent neural network maintains a hidden state $s_t$, which is provided as input to the next iteration of the network. As shown in the left portion of FIG. 4, a recurrent neural network receives a feature representation for the text section $x_t$ and a hidden state value $s_{t-1}$ determined using sets of input features of the previous text sections. The following equation provides how the hidden state $s_t$ is determined:

$$s_t = \varphi(Ux_t + Ws_{t-1}),$$

where U and W are weight values applied to $x_t$ and $s_{t-1}$ respectively, and $\varphi$ is a non-linear function such as tanh or ReLU.

The output of the recurrent neural network is expressed as:

$$o_t = softmax(Vs_t),$$

where V is a weight value applied to the hidden state value $s_t$.

Thus, the hidden state $s_t$ can be referred to as the memory of the network. The hidden state $s_t$ can depend from information associated with inputs and/or outputs used or otherwise derived from one or more previous text sections. The output at step of is a set of values used to identify section identifier for the text section, which is calculated based at least in part on the memory at text section position t.

3. Training of the Machine-Learning Model

After selecting the machine-learning model (e.g., the convolutional neural network, the recurrent neural network), the second encoder can be trained using the training data. Similar to the first encoder, the second encoder can be trained using contrastive learning to generate the second feature vector that represents the contextual data. The contrastive learning allows the second encoder to be trained using the second training set that is neither labeled nor annotated.

Figure 5:
FIG. 5 illustrates a schematic diagram for training a second encoder using contrastive learning, according to some embodiments.

FIG. 5 illustrates a schematic diagram 500 for training a second encoder using contrastive learning, according to some embodiments. As shown in FIG. 5, the training of the second encoder includes at least the following stages: (1) augmenting a training contextual-data object; (2) generating a first training feature vector in a second feature space; (3) generating a second training feature vector in the second feature space; (4) determining a loss between the first and second training feature vectors; and (5) adjusting one or more parameters of the second encoder based on the determined loss.

The training of the second encoder can be initiated by applying data augmentation 502 to a training contextual-data object 504 of a training data set to generate a first augmented training contextual-data object 506 and a second augmented training unstructured contextual-data object 508. Data augmentation 502 can include transforming the training contextual-data object 504 to generate two or more modified versions of the training contextual-data object. The data augmentation ensures that the two or more modified versions are "similar" to the training contextual-data object 504. The modified versions can be used to perform contrastive learning of a second encoder 510. For example, data augmentation of contextual-data object can include back-translation of text data, in which the contextual-data object can be translated from an original source language (e.g., English) to a target language (e.g., German), and back to the original source language. Other examples of text augmentation of contextual-data object can include random swap of one or more words in the training contextual-data object 504, and random synonym replacement of the one or more words in the contextual-data object 504.

The second encoder 510 can process the first augmented training contextual-data object 506 into the first training feature vector 512 in a second feature space 516. The first training feature vector 512 can be an n-dimensional vector of values that collectively represent the first augmented training contextual-data object 506. The second feature space 516 can be an n-dimensional space at which the first training feature vector 512 of the training contextual-data object can be identified by its corresponding location. In some instances, a residual neural network of the second encoder is applied to the first augmented training contextual-data object 506 to generate the first training feature vector 512.

The second encoder 510 can also process the second augmented training contextual-data object 508 into the second training feature vector 514 in the second feature space 516. Similar to the first training feature vector 512, the second training feature vector 514 can be an n-dimensional vector of values that collectively represent the second augmented training contextual-data object 508. In some instances, the residual neural network of the second encoder 510 is also applied to the second augmented training contextual-data object 508 to generate the second training feature vector 514. The training of the second encoder 510 can be performed such that first training feature vector 512 and the second training feature vector 514 can both encode the one or more characteristics of the training contextual-data object 504.

A loss 518 can be determined between the first and second training feature vectors 512 and 514. The determined loss 518 can identify a performance level of the second encoder 510 during the training phase. For example, the determined loss 518 can decrease if the second encoder 510 predicts that the first and second training feature vectors 512 and 514 are similar to each other. Conversely, the determined loss 518 can increase if the second encoder 510 predicts that the first and second training feature vectors 512 and 514 are different from each other. The loss 518 can be determined by: (1) determining a loss (e.g., a cosine similarity, a distance) between the first and second training feature vectors 512 and 514; and (2) applying a second contrastive loss function to the determined loss. In some instances, the second contrastive loss function is a cross-entropy loss function defined to penalize instances where locations of first and second training feature vectors 512 and 514 are far apart in the second feature space.

The second encoder can adjust one or more of its parameters 520 based on the determined loss. Adjusting the parameters 520 of the second encoder 510 can be performed to minimize, within the second feature space 516, the determined loss between the first and second training feature vectors 512 and 514. By identifying "similar" contextual data objects without labels or annotations, the training of the second encoder 510 can facilitate identification of characteristics of the contextual data.

C. Additional Training of the First Encoder and the Second Encoder

In addition to separately training the first and second encoders, the training phase can further include training the first and second encoders together in a shared feature space. The additional training can ensure that the first and second feature vectors represent the same particular event in their respective feature spaces. Thus, training of the first and second encoders can be performed based on, in the shared feature space, a loss determined between a first training feature vectors generated by the first encoder and a second training feature vector generated by the second encoder. In some instances, the training includes generating a vector in the shared feature space based on: (i) a first training transformed feature vector generated by applying a first projection function to the first feature vector 108; and (ii) a second training transformed feature vector generated by applying a second projection function to the second feature vector 110. The vector can be generated by combining information from the first training transformed feature vector and the second training transformed feature vector to result in the vector with improved projected predictiveness over either the first training feature vector or the second training feature vector in isolation.

Figure 6:
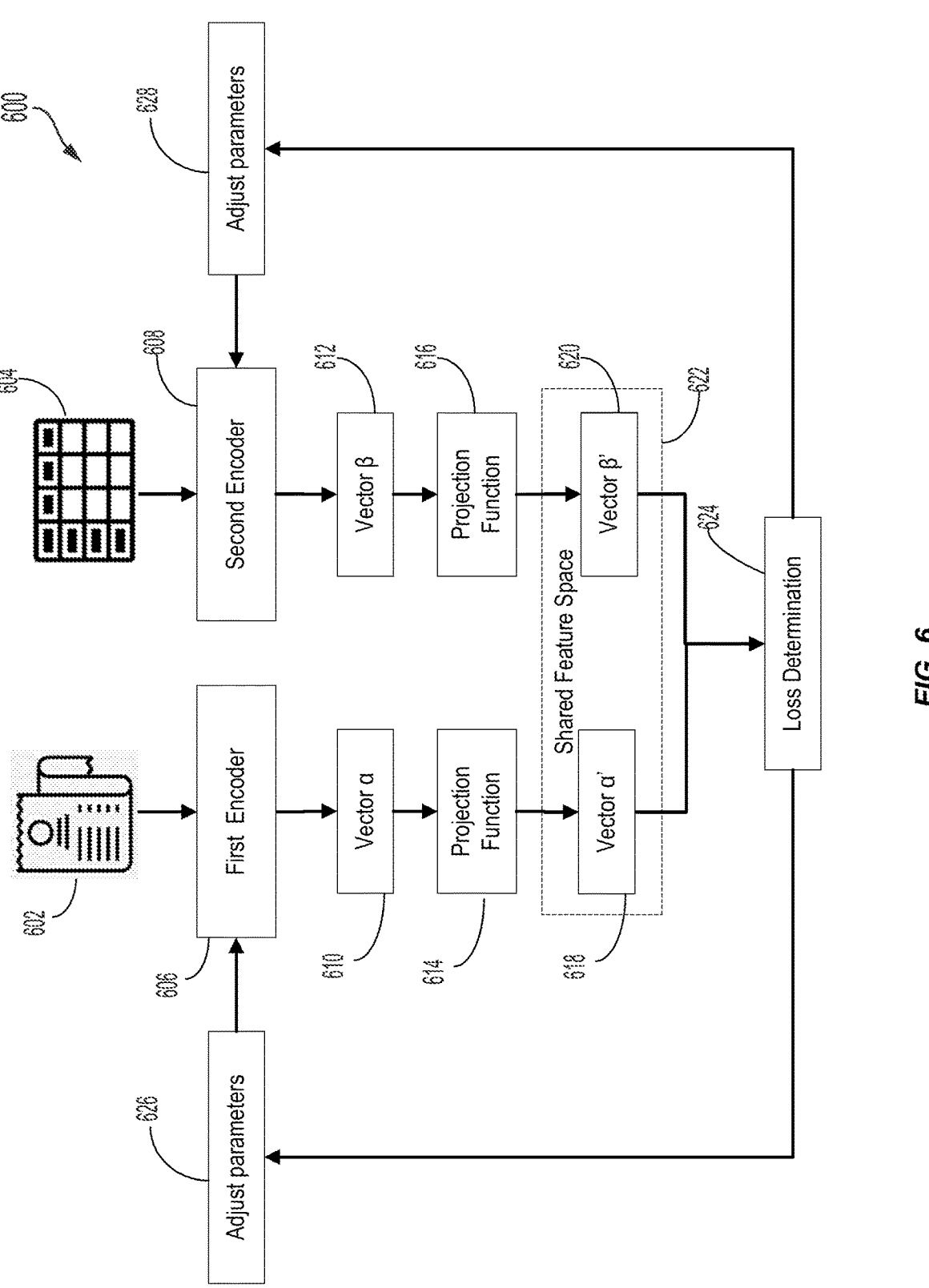
FIG. 6 illustrates a schematic diagram for additionally training a first encoder and a second encoder using contrastive learning, according to some embodiments.

FIG. 6 illustrates a schematic diagram 600 for additionally training a first encoder and a second encoder using contrastive learning, according to some embodiments. As shown in FIG. 6, the training of the first and second encoders can include at least the following stages: (1) selecting a matching training unstructured data file and training contextual-data object; (2) generating a first transformed training feature vector of the training unstructured data file in the shared feature space; (3) generating a second transformed training feature vector of the training contextual-data object in the shared feature space; and (4) determining a loss between the first and second transformed training feature vectors; and (5) adjusting one or more parameters of the first encoder and one or more parameters of the second encoder based on the determined loss.

The additional training can be initiated by selecting to a matching training unstructured data file 602 and training contextual-data object 604. The selection can include determining that there are overlapping data between the matching training unstructured data file 602 and training contextual-data object 604. For example, expense report data identified in the training contextual-data object 604 can include purchase description, entity information, data and time of purchase, many of which matching the corresponding information identified in the training unstructured data file 602. In some instances, the matching information can be identified by extracting text data from the training unstructured data file 602 using optical character recognition.

A first encoder 606 can process the training unstructured data file 602 into a first training feature vector 610 in a first feature space. A second encoder 608 can process the training contextual-data object 604 into a second training feature vector 612 in a second feature space. To train the first encoder 606 to recognize that the training unstructured data file 602 and training contextual-data object 604 correspond to the same particular event, a first projection function 614 can be applied to transform the first feature vector 610 into a first transformed training feature vector 618 in a shared feature space 622. Similarly, to train the second encoder 608 to recognize that the training unstructured data file 602 and training contextual-data object 604 correspond to the same particular event, a second projection function 616 can be applied to transform the second feature vector 612 into a second transformed training feature vector 620 in the shared feature space 622. The shared feature space 622 can be an n-dimensional space at which both of the first transformed training feature vector 618 and the second transformed training feature vector 620 can be identified by their respective locations. The first projection function 614 and the second projection 616 can transform the training feature vectors such that the transformed feature vectors can be compared directly within the same shared feature space 622 during contrastive learning.

A loss 624 between the first transformed training feature vector 618 and the second transformed training feature vector 620. The determined loss 624 can identify a performance level of both of the first encoder 606 and the second encoder 608 in predicting whether the training unstructured data file and the training contextual-data object identify the same particular event. For example, the determined loss 624 can decrease if it predicted that the first transformed training feature vector 618 and the second transformed training feature vector 620 are generated to be similar to each other. Conversely, the determined loss 618 can increase if it is predicted that the first transformed training feature vector 618 and the second transformed training feature vector 620 are different from each other. The loss 624 can be determined by: (1) determining a loss (e.g., a cosine similarity, a distance) between the first transformed training feature vector 618 and the second transformed training feature vector 620; and (2) applying a combined contrastive loss function to the determined loss. In some instances, the combined contrastive loss function is a cross-entropy loss function defined to penalize instances where locations of the first transformed training feature vector 618 and the second transformed training feature vector 620 are far apart in the shared feature space 622.

In some instances, the first contrastive loss function and the second contrastive loss function are combined and weighted by one or more weighting factors, such that the combined loss function can be used during the additional training. A weighting factor can be a hyperparameter that can be tuned during the additional training of the first and second encoders 606 and 608. Thus, the contrastive learning of the first and second encoders 606 and 608 can ensure that the an unstructured data file and a corresponding contextual data identify the same particular event, based on the loss determined within the shared feature space 622.

For example, a first weighting factor being applied to the first transformed training feature vector 618 can be increased relative to a second weighting factor being applied to the second transformed training feature vector 620. The increase of the first weighting factor can be performed in response to a determination that an unstructured data file is more predictive of the event. Conversely, the second weighting factor can be increased relative to the first weighting factor. The increase of the second weighting factor can be performed in response to another determination that the contextual data is more predictive of the event. The adjustment of the weighting factors can be performed at before or during the training of the first and second encoders. As a result, the combined loss functions can determine a weighted loss that can be used to adjust the parameters of the first and second encoders, such that the first and second encoders can improve its predictiveness of detecting anomalous events.

In another example, the first and second weighting factors can be configured to be the same value. The configuration of the first and second weighting factors allows the training of the first and second encoders to be trained without supervision. In addition, the configuration can be performed until the predictiveness for detecting anomalous events can reach the intended result (e.g., a loss minimized to fall under a predetermined threshold).

Additionally or alternatively, the one or more weighting factors are parameters that can be adjusted based on a loss determined by the combined loss function. In effect, the one or more weighting factors can be learned in conjunction with the parameters of the first and second encoders. The learning of the weighting factors during training can be performed without supervision. In addition, the learning of the weighting factors can facilitate improved prediction of anomalous events based on information that may initially have been considered as tangential.

The first encoder 606 can then adjust one or more of its parameters 626 based on the determined loss 624. The second encoder 608 can adjust one or more of its parameters 628 based on the determined loss 624. Adjusting of the parameters 626 of the first encoder 606 and adjusting of the parameters 628 of the second encoder 608 can both be performed to minimize, within the shared feature space 622, the loss determined between the first and second transformed training feature vectors 618 and 620. In effect, by learning "similar" events, the additional training of the first encoder 606 and the second encoder 608 can facilitate identification of characteristics of events without labels or annotations.

D. Machine-Learning Techniques for Predicting the Anomalous Event

The first feature vector generated by the first encoder and the second feature vector generated by the second encoder can be used by another machine-learning model to predict whether a particular event identified in an unstructured data file corresponds to an anomalous event. In some instances, a classification engine (e.g., the classification engine 124 of FIG. 1) is trained to generate a classification result by: (1) processing a training contextual-data object and/or a training unstructured data file associated with the particular event to generate an intermediate output; (2) determining a loss between the intermediate output and an event-data input element that includes the training first feature vector and the training second feature vector; and (3) adjusting one or more parameters of the machine-learning model of the classification engine based on the determined loss. The event-data input element can be configured as a target label of the contextual-data object. In some instances, during training of the classification engine, parameters of the first and second encoders remain unmodified. In some instances, the classification engine further processes feedback data to enhance accuracy of the machine-learning model to predict the classification result. In some instances, the feedback data is used to adjust values of the first feature vector and/or the second feature vector of the event-data input element.

1. Training Data

In some embodiments, training data for the classification engine includes a third training set of labeled contextual-data objects. The training contextual-data object include any information that describe an environment associated with a particular event identified by a corresponding training unstructured data file of the first training set. The training contextual-data object can include unstructured data, including unstructured text. In some instances, the training contextual-data object includes structured data formatted in accordance with a corresponding database schema or a document object model. Additionally or alternatively, each labeled contextual-data object can also be associated with a corresponding training unstructured data file.

In some instances, each training contextual-data object of the third training set is labeled with a corresponding event-data input element. The event-data input element can be a data structure (e.g., a tuple) that includes a set of feature vectors that can be used to predict whether the particular event corresponds to an anomalous event. The set of feature vectors can include a first feature vector generated by a first encoder by processing a training unstructured data file and a second feature vector generated by a second encoder by processing a training contextual-data object. The event-data input element can be used as a target label of the contextual-data object, such that the classification engine can be trained to predict anomalous events without manually labeling or annotating each training contextual-data object.

Additionally or alternatively, each training contextual-data object of the third training set can be associated with feedback data for the training contextual-data object. The feedback data can include data manually inputted by a user to adjust values of the first feature vector and/or the second feature vector of the event-data input element. The feedback data can be configured to enhance or update the training label of a corresponding training contextual-data object. The training contextual-data object can be associated with the feedback data in response to another prediction that one of the first training feature vector and second training feature vector of the event-data input element deviates from an expected vector value.

2. Machine-Learning Model Selection

One or more machine-learning models of the classification engine can then be selected for training. A machine-learning model of the first encoder can be an artificial neural network, a convolutional neural network, an inception neural network, a residual neural network, a recurrent neural network, long short-term memory models, gated recurrent units models, or other variants of Deep Neural Networks. The machine-learning model can also be any other suitable model that can be trained to generate feature vectors from unstructured data files, such as a Naive Bayes Classifier, Linear Classifier, Support Vector Machine, Bagging Models such as Random Forest Model, Boosting Models, Shallow Neural Networks, or combinations of one or more of such techniques—e.g., Multi-Scale Convolutional Neural Network. In some instances, the classification engine has a multiclass classifier model, in which the classification result corresponds to a class that is associated with the highest prediction score.

3. Training of the Machine-Learning Model

Figure 7:
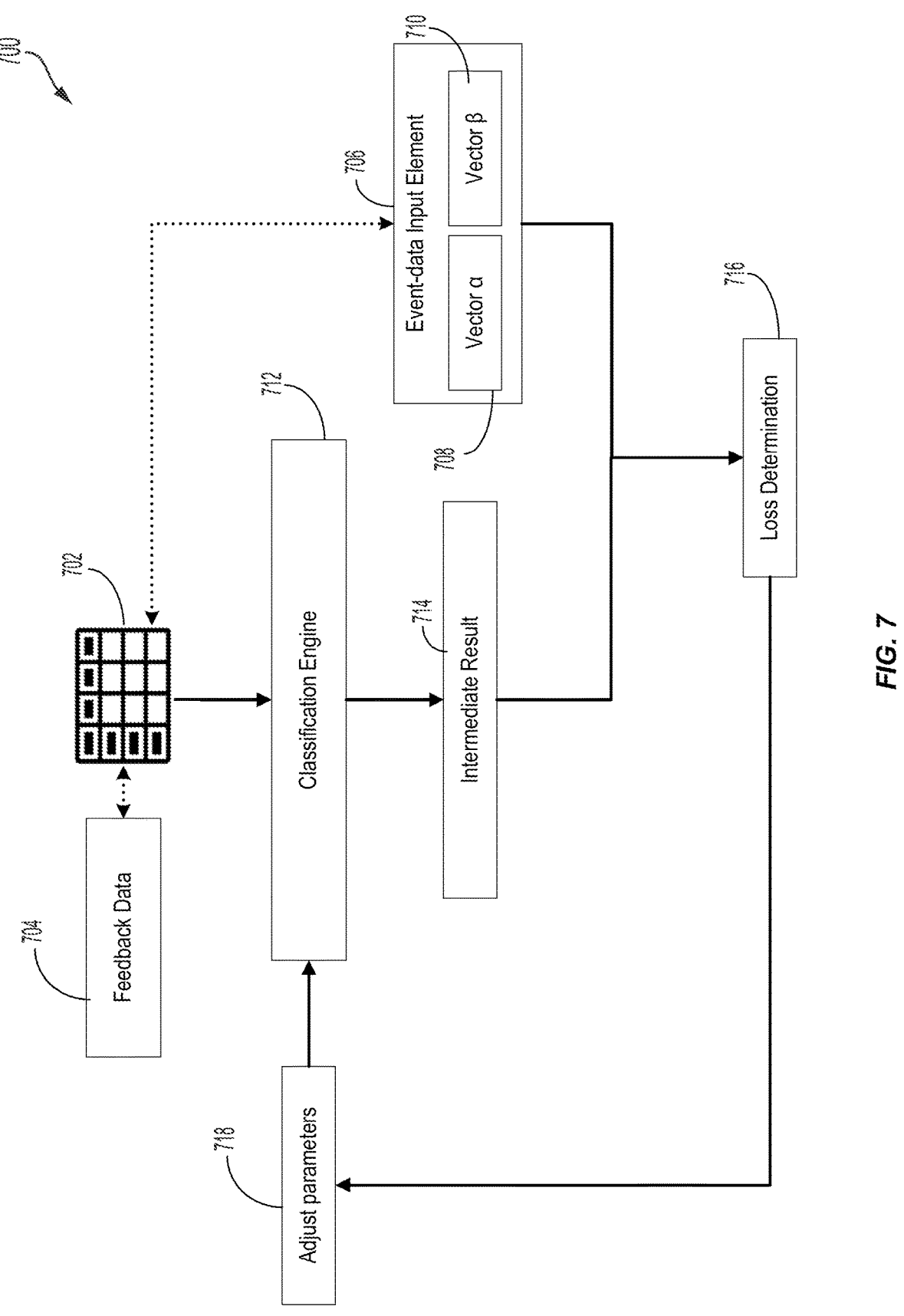
FIG. 7 illustrates a schematic diagram for training a classification engine to predict anomalous events, according to some embodiments.

FIG. 7 illustrates a schematic diagram 700 for training a classification engine to predict anomalous events, according to some embodiments. As shown in FIG. 7, the training of the machine-learning model of the classification engine can include using a training contextual-data object of the third training set and a corresponding event-data input element as input. An intermediate output can be generated from the machine-learning model by processing the training contextual-data object and the corresponding event-data input element. The intermediate output can predict a probability that an event identified by the training contextual-data object corresponds to a particular type of event (e.g., normal event, anomalous event). A loss can be determined by applying a loss function (e.g., a cross-entropy loss function) to the intermediate output and the event-data input element which is configured as a target label of the training contextual-data object. The determined loss can be used to adjust parameters of the machine-learning model of the classification engine, such that the loss can be minimized by using the training data.

The training of the classification engine can be initiated by accessing a training contextual-data object 702 and a training event-data input element 706. The training event-data input element 706 includes a first training feature vector 708 and a second training feature vector 710. The first training feature vector 708 can be generated by processing a corresponding training unstructured data file using a first encoder (e.g., the first encoder 410 of FIG. 4). In addition, the second training feature vector 710 can be generated by processing the contextual-data object 702 using a second encoder (e.g., the second encoder 610 of FIG. 6). The event-data input element can be used as a target label of the contextual-data object, such that the classification engine can be trained to predict anomalous events without manually labeling or annotating each training contextual-data object.

In some instances, the training contextual-data object 702 can be associated with feedback data 704. The association of the feedback data can be performed in response to another prediction that one of the first training feature vector 708 and second training feature vector 710 of the event-data input element 706 deviates from an expected vector value. For example, a first deviation from a first expected vector value of the first feature vector 708 can be predicted by: (1) generating a distribution of the training first feature vectors of the first feature space; (2) determining that the first feature vector 708 corresponds to an outlier of the generated distribution; and (3) determining that the first feature vector 708 deviates from the expected vector value. In some instances, the outlier is determined by determining an inter-quartile range value of the generated distribution and determining that the first feature vector falls below or exceeds the inter-quartile range value. The outlier can also be determined by: (1) determining a z-score of the first feature vector; and (2) determining that the z-score falls below a first predetermined threshold (e.g., −3) or exceeds a second predetermined threshold (e.g., 3).

A classification engine 712 can process the training contextual-data object 702 to generate an intermediate result 714. The intermediate result 714 can include one or more values that represent the training contextual-data object 702. In some instances, the classification engine can include an artificial neural network that generates the intermediate result 714.

A loss 716 can be determined between the intermediate result 714 and the training event-data input element 706. The determined loss 716 can identify a performance level of the classification engine 712 on whether it can predict whether a particular event corresponds to an anomalous event. For example, the determined loss 716 can decrease if the classification engine 712 predicts that the intermediate result 714 and the training event-data input element 706 are similar to each other. Conversely, the determined loss 716 can increase if the classification engine 712 predicts that the intermediate result 714 and the training event-data input element 706 are different from each other.

The classification engine can adjust one or more of its parameters 718 based on the determined loss. Adjusting the parameters 718 of the classification engine 712 can be performed to minimize the determined loss 716 between the intermediate result 714 and the training event-data input element 706. By identifying "similar" contextual-data objects using the event-data input element, the training of the classification engine 712 can used to predict that the particular event corresponds to an anomalous event if a determined loss of a given contextual data and a corresponding event-data input element exceeds a predetermined threshold.

IV. Predicting Anomalous Events using Contrastive Learning

FIG. 8 includes a flowchart 800 illustrating an example of a method of for predicting anomalous events using contrastive learning, according to some embodiments. Some of the operations described in flowchart 800 may be performed by a computer system. Although flowchart 800 may describe the operations as a sequential process, in various embodiments, many of the operations may be performed in parallel or concurrently. In addition, the order of the operations may be rearranged. An operation may have additional steps not shown in the figure. Furthermore, some embodiments of the method may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium.

At step 802, an anomalous-event prediction system (e.g., the anomalous-event prediction system 100) can access an unstructured data file. The unstructured data file identifies an occurrence of a particular event. The unstructured data file 102 can correspond to a particular file format, including email file format (e.g., MSG), image file format (e.g., JPG, JPEG, PNG, BMP), web page format (e.g., HTML), document file format (e.g., DOC, PDF, XPS, EPUB), audio file format (e.g., MP3, M4A), video file format (e.g., MPEG, MOV), and other types of file formats.

At step 804, the anomalous-event prediction system can access contextual data associated with the unstructured data file. The contextual data include information that describe an environment at which the particular event occurred. For example, the contextual data can identify a location at which the particular event occurred or another preceding or ensuing event that is predicted to be relevant to the particular event. In some instances, the anomalous-event prediction system applies one or more pre-processing operations (e.g., normalization, filtering) to the contextual data to enhance performance of encoders that process the contextual data. For example, a flattening operation can be applied to the contextual data by merging data records (e.g., overlapping data records) accessed from one or more data stores into a single or reduced number of table and removing any redundant data.

At step 806, the anomalous-event prediction system can generate a first feature vector of the set of feature vectors by using a first encoder to process the unstructured data file. The first feature vector represents the unstructured data file in a first feature space. In some instances, the first encoder includes a residual neural network or a convolutional neural network. The first encoder can be trained to generate the first feature vector for the unstructured data file, where a loss is defined so as to penalize instances where locations of feature vectors of similar training elements (e.g., training unstructured data files) are far apart in the first feature space and/or instances where locations of feature vectors of different training elements are close together in the first feature space.

At step 808, the anomalous-event prediction system can generate a second feature vector of the set of feature vectors by using a second encoder to process the contextual data. The second feature vector represents the contextual data in a second feature space. The second encoder can be trained to generate the second feature vector for the contextual data, where another loss is defined so as to penalize instances where locations of feature vectors of similar training elements (e.g., training contextual data) are far apart in the second feature space and/or instances where locations of feature vectors of different training elements are close together in a the second feature space.

In some instances, the second encoder includes another convolutional neural network. The second encoder can have an architecture that is the same or different from that of the first encoder. Each of the first and second encoders and can thus be trained to generate the feature vectors in their respective feature spaces, in which the first and second encoders may not share any parameters.

In some instances, one or more parameters of the first encoder and the one or more parameters of the second encoder were learned by: (i) transforming a first training feature vector at the first feature space to generate a first training transformed feature vector that represents a training unstructured data file in a shared feature space, in which the training unstructured data file identifies a training event; (ii) transforming a second training feature vector at the second feature space to generate a second training transformed feature vector that represents a training contextual data in the shared feature space, in which the training contextual data identifies the same training event; and (iii) generating a third training vector in the shared feature space based on the first training transformed feature vector and the second training transformed feature vector, wherein the generating comprises combining information from the first training transformed feature vector and the second training transformed feature vector to result in the third training vector with improved projected predictiveness over either the first training feature vector or the second training feature vector in isolation.

In some instances, the training of the first and second encoders includes using a combined loss function to determine a loss between the first and second transformed training feature vectors and adjusting one or more parameters of the first encoder and one or more parameters of the second encoder based on the determined loss. The combined loss function can include a first contrastive loss function and the a second contrastive loss function. The combined loss function can be weighted by one or more weighting factors, which can be adjusted based on a relative predictiveness of a training unstructured data file and/or contextual data.

At step 810, the anomalous-event prediction system can generate an event-data input element for the unstructured data file. The event-data input element can include a set of feature vectors. The set of feature vectors can include the first feature vector and the second feature vector that are processed by a machine-learning model (e.g., a classifier model) to predict whether the particular event identified in the unstructured data file corresponds to an anomalous event.

At step 812, the anomalous-event prediction system can generate a classification result of the unstructured data file by using a machine-learning model to process the event-data input element. In some instances, the classification result includes a prediction of whether the particular event corresponds to an anomalous event. The classification result can also include a severity score of the anomalous event with a confidence interval. The severity score can be then used to categorize or cluster predicted anomalous events. For example, the anomalous events can be clustered to rank the anomalous events based on the predicted severity scores. The downstream pipeline tasks can use this information for subsequent actions. The machine-learning model can be trained to process the contextual data and/or the unstructured data file to generate an intermediate output. The intermediate output can be compared with the event-data input element being used as a target label. Based on the comparison, the machine-learning model can generate the prediction of whether the particular event corresponds to an anomalous event. The machine-learning model can include an artificial neural network or a tree-based classifier.

In some instances, the anomalous-event prediction system determines that, in the second feature space, another loss between the second feature vector and another feature vector exceeds a predetermined threshold. In response to determining that the other loss exceeds the predetermined threshold, the anomalous-event prediction system can receive feedback data associated with the contextual data. The feedback data can be processed using the machine-learning model to generate the classification result.

At step 814, the anomalous-event prediction system can output the classification result. For example, the classification result can be locally presented or transmitted to another device. The result can be outputted along with an identifier of the unstructured data file. Process 800 terminates thereafter.

V. Illustrative Systems

Figure 9:
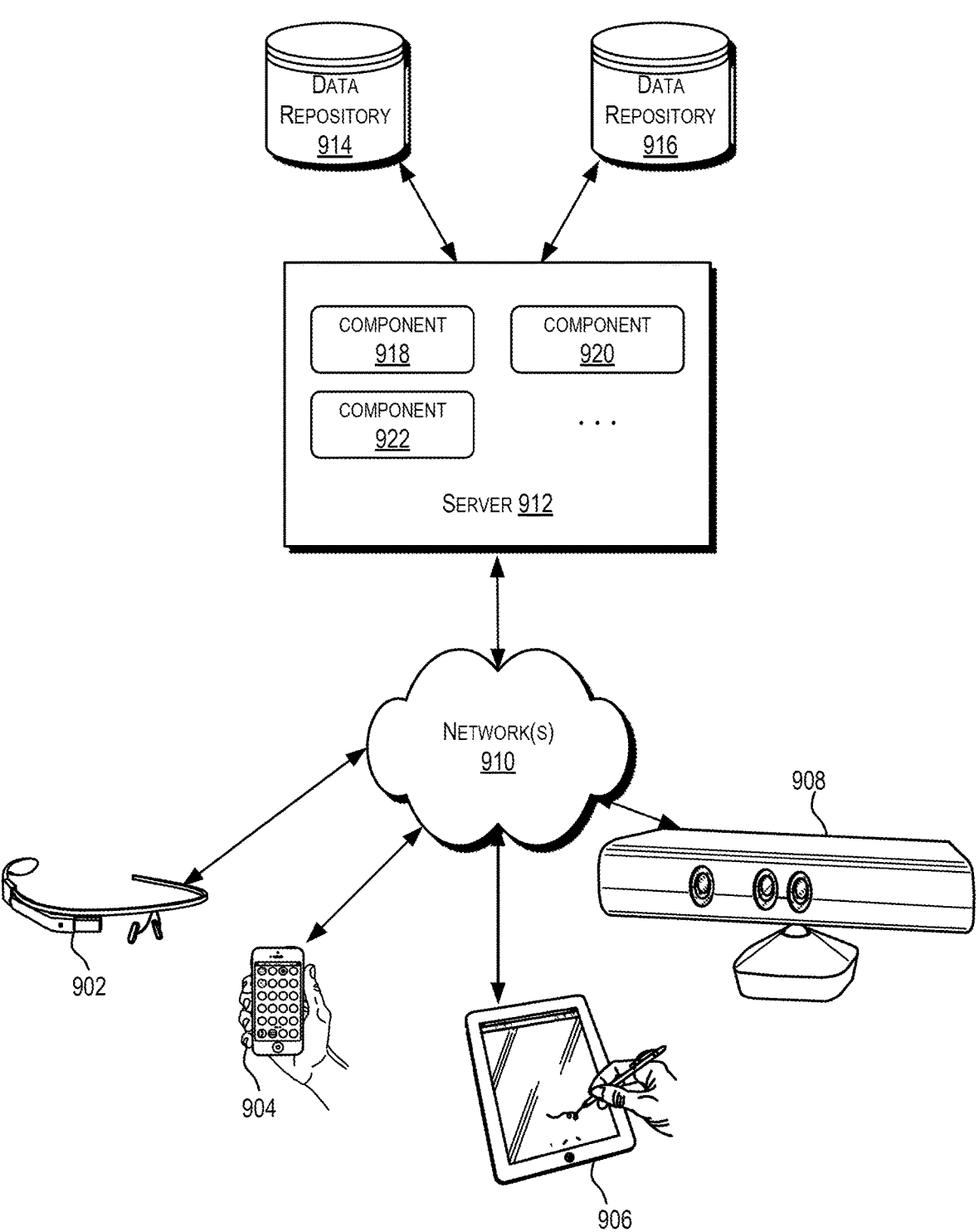
FIG. 9 illustrates a simplified diagram illustrating a distributed system for implementing one of the embodiments.

FIG. 9 depicts a simplified diagram of a distributed system 900 for implementing one of the embodiments. In the illustrated embodiment, distributed system 900 includes one or more client computing devices 902, 904, 906, and 908, which are configured to execute and operate a client application such as a web browser, proprietary client (e.g., Oracle Forms), or the like over one or more network(s) 910. Server 912 may be communicatively coupled with remote client computing devices 902, 904, 906, and 908 via network 910.

In various embodiments, server 912 may be adapted to run one or more services or software applications provided by one or more of the components of the system. In some embodiments, these services may be offered as web-based or cloud services or under a Software as a Service (SaaS) model to the users of client computing devices 902, 904, 906, and/or 908. Users operating client computing devices 902, 904, 906, and/or 908 may in turn utilize one or more client applications to interact with server 912 to utilize the services provided by these components.

In the configuration depicted in the figure, the software components 918, 920, and 922 of system 900 are shown as being implemented on server 912. In other embodiments, one or more of the components of system 900 and/or the services provided by these components may also be implemented by one or more of the client computing devices 902, 904, 906, and/or 908. Users operating the client computing devices may then utilize one or more client applications to use the services provided by these components. These components may be implemented in hardware, firmware, software, or combinations thereof. It should be appreciated that various different system configurations are possible, which may be different from distributed system 900. The embodiment shown in the figure is thus one example of a distributed system for implementing an embodiment system and is not intended to be limiting.

Client computing devices 902, 904, 906, and/or 908 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers, and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 902, 904, 906, and 908 may be any other electronic device, such as a thin-client computer, an Internet-enabled gaming system (e.g., a Microsoft Xbox gaming console with or without a Kinect® gesture input device), and/or a personal messaging device, capable of communicating over network(s) 910.

Although exemplary distributed system 900 is shown with four client computing devices, any number of client computing devices may be supported. Other devices, such as devices with sensors, etc., may interact with server 912.

Network(s) 910 in distributed system 900 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 910 can be a local area network (LAN), such as one based on Ethernet, Token-Ring and/or the like. Network(s) 910 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 912 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 912 may be adapted to run one or more services or software applications described in the foregoing disclosure. For example, server 912 may correspond to a server for performing processing described above according to an embodiment of the present disclosure.

Server 912 may run an operating system including any of those discussed above, as well as any commercially available server operating system. Server 912 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 912 may include one or more applications to analyze and consolidate data feeds and/or event updates received from users of client computing devices 902, 904, 906, and 908. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 912 may also include one or more applications to display the data feeds and/or real-time events via one or more display devices of client computing devices 902, 904, 906, and 908.

Distributed system 900 may also include one or more databases 914 and 916. Databases 914 and 916 may reside in a variety of locations. By way of example, one or more of databases 914 and 916 may reside on a non-transitory storage medium local to (and/or resident in) server 912. Alternatively, databases 914 and 916 may be remote from server 912 and in communication with server 912 via a network-based or dedicated connection. In one set of embodiments, databases 914 and 916 may reside in a storage-area network (SAN). Similarly, any necessary files for performing the functions attributed to server 912 may be stored locally on server 912 and/or remotely, as appropriate. In one set of embodiments, databases 914 and 916 may include relational databases, such as databases provided by Oracle, that are adapted to store, update, and retrieve data in response to SQL-formatted commands.

Figure 10:
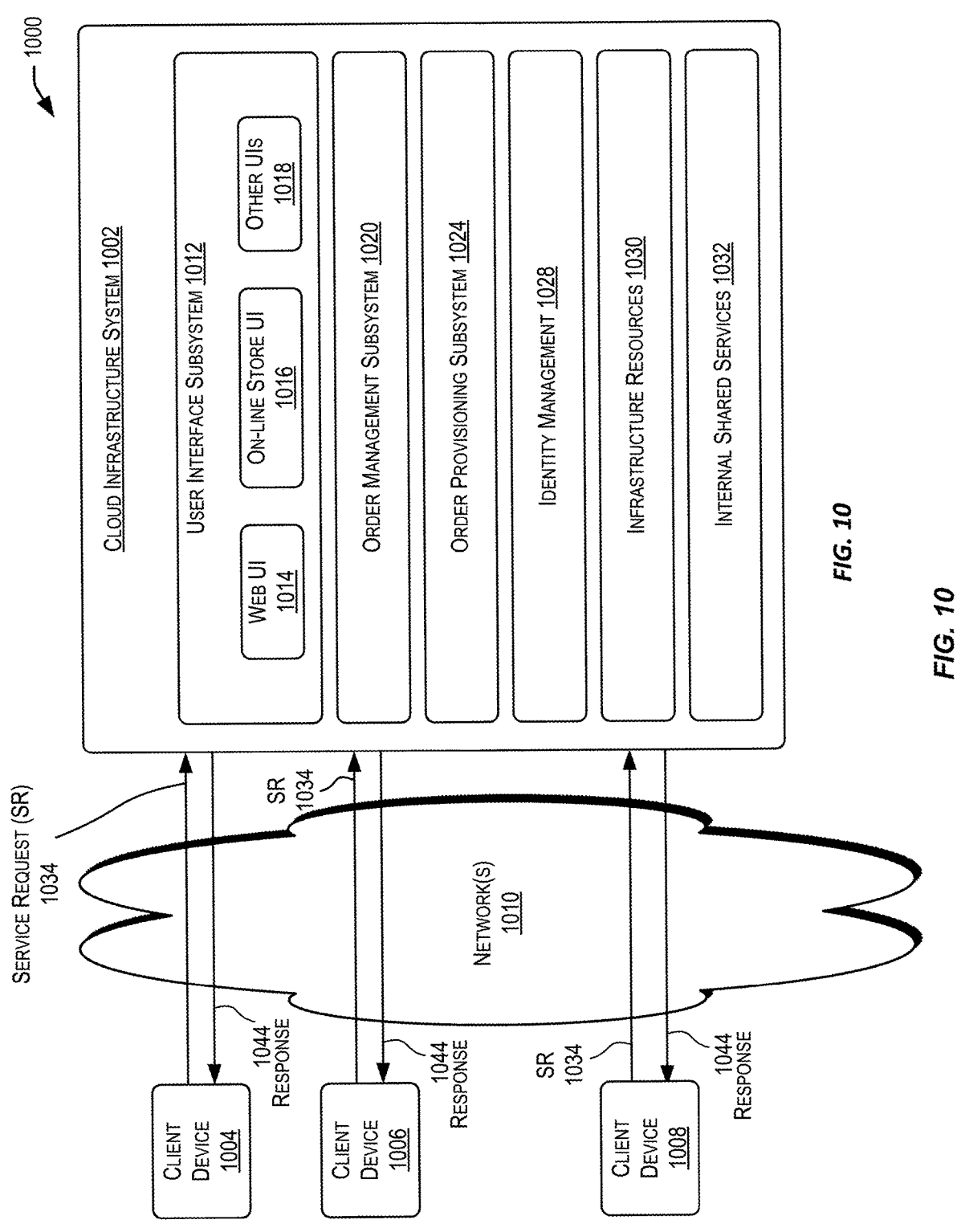
FIG. 10 illustrates a simplified block diagram illustrating one or more components of a system environment.

FIG. 10 is a simplified block diagram of one or more components of a system environment 1000 by which services provided by one or more components of an embodiment system may be offered as cloud services, in accordance with an embodiment of the present disclosure. In the illustrated embodiment, system environment 1000 includes one or more client computing devices 1004, 1006, and 1008 that may be used by users to interact with a cloud infrastructure system 1002 that provides cloud services. The client computing devices may be configured to operate a client application such as a web browser, a proprietary client application (e.g., Oracle Forms), or some other application, which may be used by a user of the client computing device to interact with cloud infrastructure system 1002 to use services provided by cloud infrastructure system 1002.

It should be appreciated that cloud infrastructure system 1002 depicted in the figure may have other components than those depicted. Further, the embodiment shown in the figure is only one example of a cloud infrastructure system that may incorporate an embodiment of the invention. In some other embodiments, cloud infrastructure system 1002 may have more or fewer components than shown in the figure, may combine two or more components, or may have a different configuration or arrangement of components.

Client computing devices 1004, 1006, and 1008 may be devices similar to those described above for 902, 904, 906, and 908.

Although exemplary system environment 1000 is shown with three client computing devices, any number of client computing devices may be supported. Other devices such as devices with sensors, etc. may interact with cloud infrastructure system 1002.

Network(s) 1010 may facilitate communications and exchange of data between clients 1004, 1006, and 1008 and cloud infrastructure system 1002. Each network may be any type of network familiar to those skilled in the art that can support data communications using any of a variety of commercially-available protocols, including those described above for network(s) 910.

Cloud infrastructure system 1002 may comprise one or more computers and/or servers that may include those described above for server 912.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1002 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1002 may be adapted to automatically provision, manage, and track a customer's subscription to services offered by cloud infrastructure system 1002. Cloud infrastructure system 1002 may provide the cloud services via different deployment models. For example, services may be provided under a public cloud model in which cloud infrastructure system 1002 is owned by an organization selling cloud services (e.g., owned by Oracle) and the services are made available to the general public or different industry enterprises. As another example, services may be provided under a private cloud model in which cloud infrastructure system 1002 is operated solely for a single organization and may provide services for one or more entities within the organization. The cloud services may also be provided under a community cloud model in which cloud infrastructure system 1002 and the services provided by cloud infrastructure system 1002 are shared by several organizations in a related community. The cloud services may also be provided under a hybrid cloud model, which is a combination of two or more different models.

In some embodiments, the services provided by cloud infrastructure system 1002 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1002. Cloud infrastructure system 1002 then performs processing to provide the services in the customer's subscription order.

In some embodiments, the services provided by cloud infrastructure system 1002 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various cloud applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1002 may also include infrastructure resources 1030 for providing the resources used to provide various services to customers of the cloud infrastructure system. In one embodiment, infrastructure resources 1030 may include pre-integrated and optimized combinations of hardware, such as servers, storage, and networking resources to execute the services provided by the PaaS platform and the SaaS platform.

In some embodiments, resources in cloud infrastructure system 1002 may be shared by multiple users and dynamically re-allocated per demand. Additionally, resources may be allocated to users in different time zones. For example, cloud infrastructure system 1030 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1032 may be provided that are shared by different components or modules of cloud infrastructure system 1002 and by the services provided by cloud infrastructure system 1002. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1002 may provide comprehensive management of cloud services (e.g., SaaS, PaaS, and IaaS services) in the cloud infrastructure system. In one embodiment, cloud management functionality may include capabilities for provisioning, managing, and tracking a customer's subscription received by cloud infrastructure system 1002, and the like.

In one embodiment, as depicted in the figure, cloud management functionality may be provided by one or more modules, such as an order management module 1020, an order orchestration module 1022, an order provisioning module 1024, an order management and monitoring module 1026, and an identity management module 1028. These modules may include or be provided using one or more computers and/or servers, which may be general purpose computers, specialized server computers, server farms, server clusters, or any other appropriate arrangement and/or combination.

In exemplary operation 1034, a customer using a client device, such as client device 1004, 1006 or 1008, may interact with cloud infrastructure system 1002 by requesting one or more services provided by cloud infrastructure system 1002 and placing an order for a subscription for one or more services offered by cloud infrastructure system 1002. In certain embodiments, the customer may access a cloud User Interface (UI), cloud UI 1012, cloud UI 1014 and/or cloud UI 1016 and place a subscription order via these UIs. The order information received by cloud infrastructure system 1002 in response to the customer placing an order may include information identifying the customer and one or more services offered by the cloud infrastructure system 1002 that the customer intends to subscribe to.

After an order has been placed by the customer, the order information is received via the cloud UIs, 1012, 1014, and/or 1016.

At operation 1036, the order is stored in order database 1018. Order database 1018 can be one of several databases operated by cloud infrastructure system 1018 and operated in conjunction with other system elements.

At operation 1038, the order information is forwarded to an order management module 1020. In some instances, order management module 1020 may be configured to perform billing and accounting functions related to the order, such as verifying the order, and upon verification, booking the order.

At operation 1040, information regarding the order is communicated to an order orchestration module 1022. Order orchestration module 1022 may utilize the order information to orchestrate the provisioning of services and resources for the order placed by the customer. In some instances, order orchestration module 1022 may orchestrate the provisioning of resources to support the subscribed services using the services of order provisioning module 1024.

In certain embodiments, order orchestration module 1022 enables the management of processes associated with each order and applies logic to determine whether an order should proceed to provisioning. At operation 1042, upon receiving an order for a new subscription, order orchestration module 1022 sends a request to order provisioning module 1024 to allocate resources and configure those resources needed to fulfill the subscription order. Order provisioning module 1024 enables the allocation of resources for the services ordered by the customer. Order provisioning module 1024 provides a level of abstraction between the cloud services provided by cloud infrastructure system 1000 and the physical implementation layer that is used to provision the resources for providing the requested services. Order orchestration module 1022 may thus be isolated from implementation details, such as whether or not services and resources are actually provisioned on the fly or pre-provisioned and only allocated/assigned upon request.

At operation 1044, once the services and resources are provisioned, a notification of the provided service may be sent to customers on client devices 1004, 1006, and/or 1008 by order provisioning module 1024 of cloud infrastructure system 1002.

At operation 1046, the customer's subscription order may be managed and tracked by an order management and monitoring module 1026. In some instances, order management and monitoring module 1026 may be configured to collect usage statistics for the services in the subscription order, such as the amount of storage used, the amount data transferred, the number of users, and the amount of system up time and system down time.

In certain embodiments, cloud infrastructure system 1000 may include an identity management module 1028. Identity management module 1028 may be configured to provide identity services, such as access management and authorization services in cloud infrastructure system 1000. In some embodiments, identity management module 1028 may control information about customers who wish to utilize the services provided by cloud infrastructure system 1002. Such information can include information that authenticates the identities of such customers and information that describes which actions those customers are authorized to perform relative to various system resources (e.g., files, directories, applications, communication ports, memory segments, etc.) Identity management module 1028 may also include the management of descriptive information about each customer and about how and by whom that descriptive information can be accessed and modified.

Figure 11:
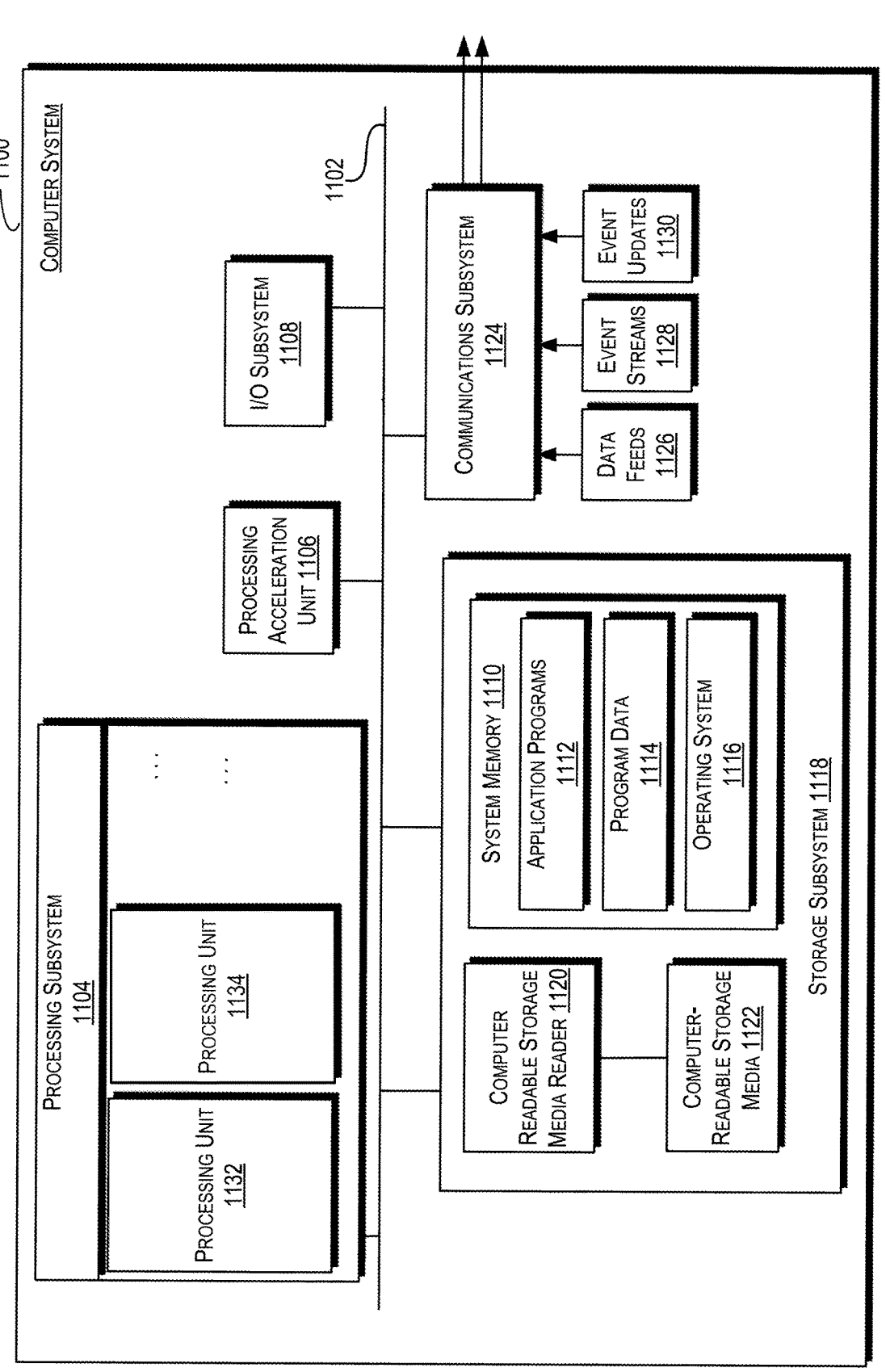
FIG. 11 illustrates an exemplary computer system, in which various embodiments of the present invention may be implemented.

FIG. 11 illustrates an exemplary computer system 1100, in which various embodiments of the present invention may be implemented. The system 1100 may be used to implement any of the computer systems described above. As shown in the figure, computer system 1100 includes a processing unit 1104 that communicates with a number of peripheral subsystems via a bus subsystem 1102. These peripheral subsystems may include a processing acceleration unit 1106, an I/O subsystem 1108, a storage subsystem 1118, and a communications subsystem 1124. Storage subsystem 1118 includes tangible computer-readable storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative embodiments of the bus subsystem may utilize multiple buses. Bus subsystem 1102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1104, which can be implemented as one or more integrated circuits (e.g., a conventional micropro-cessor or microcontroller), controls the operation of computer system 1100. One or more processors may be included in processing unit 1104. These processors may include single core or multicore processors. In certain embodiments, processing unit 1104 may be implemented as one or more independent processing units 1132 and/or 1134 with single or multicore processors included in each processing unit. In other embodiments, processing unit 1104 may also be implemented as a quad-core processing unit formed by integrating two dual-core processors into a single chip.

In various embodiments, processing unit 1104 can execute a variety of programs in response to program code and can maintain multiple concurrently executing programs or processes. At any given time, some or all of the program code to be executed can be resident in processor(s) 1104 and/or in storage subsystem 1118. Through suitable programming, processor(s) 1104 can provide various functionalities described above. Computer system 1100 may additionally include a processing acceleration unit 1106, which can include a digital signal processor (DSP), a special-purpose processor, and/or the like.

I/O subsystem 1108 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1100 may comprise a storage subsystem 1118 that comprises software elements, shown as being currently located within a system memory 1110. System memory 1110 may store program instructions that are loadable and executable on processing unit 1104, as well as data generated during the execution of these programs.

Depending on the configuration and type of computer system 1100, system memory 1110 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1104. In some implementations, system memory 1110 may include multiple different types of memory, such as static random access memory (SRAM) or dynamic random access memory (DRAM). In some implementations, a basic input/output system (BIOS), containing the basic routines that help to transfer information between elements within computer system 1100, such as during start-up, may typically be stored in the ROM. By way of example, and not limitation, system memory 1110 also illustrates application programs 1112, which may include client applications, Web browsers, mid-tier applications, relational database management systems (RDBMS), etc., program data 1114, and an operating system 1116. By way of example, operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1118 may also provide a tangible computer-readable storage medium for storing the basic programming and data constructs that provide the functionality of some embodiments. Software (programs, code modules, instructions) that when executed by a processor provide the functionality described above may be stored in storage subsystem 1118. These software modules or instructions may be executed by processing unit 1104. Storage subsystem 1118 may also provide a repository for storing data used in accordance with the present invention.

Storage subsystem 1100 may also include a computer-readable storage media reader 1120 that can further be connected to computer-readable storage media 1122. Together and, optionally, in combination with system memory 1110, computer-readable storage media 1122 may comprehensively represent remote, local, fixed, and/or removable storage devices plus storage media for temporarily and/or more permanently containing, storing, transmitting, and retrieving computer-readable information.

Computer-readable storage media 1122 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1100.

By way of example, computer-readable storage media 1122 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1100.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to connect to one or more devices via the Internet. In some embodiments communications subsystem 1124 can include radio frequency (RF) transceiver components for accessing wireless voice and/or data networks (e.g., using cellular telephone technology, advanced data network technology, such as 3G, 4G or EDGE (enhanced data rates for global evolution), Wi-Fi (IEEE 1202.11 family standards, or other mobile communication technologies, or any combination thereof), global positioning system (GPS) receiver components, and/or other components. In some embodiments communications subsystem 1124 can provide wired network connectivity (e.g., Ethernet) in addition to or instead of a wireless interface.

In some embodiments, communications subsystem 1124 may also receive input communication in the form of structured and/or unstructured data feeds 1126, event streams 1128, event updates 1130, and the like on behalf of one or more users who may use computer system 1100.

By way of example, communications subsystem 1124 may be configured to receive data feeds 1126 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1124 may also be configured to receive data in the form of continuous data streams, which may include event streams 1128 of real-time events and/or event updates 1130 that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1124 may also be configured to output the structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1100 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:
    tuning a first encoder to process unstructured data files by determining one or more first parameters of the first encoder and tuning a second encoder to process contextual data items by determining one or more second parameters of the second encoder at least in part by:
        transforming a first training feature vector generated by the first encoder at in a first feature space to generate a first training transformed feature vector that represents a training unstructured data file in a shared feature space, wherein the training unstructured data file identifies a training event;
        transforming a second training feature vector generated by the second encoder in a second feature space to generate a second training transformed feature vector that represents a training contextual data in the shared feature space, wherein the training contextual data identifies the same training event as the training unstructured data file;
        determining, using a contrastive loss function, a contrastive loss in the shared feature space between the first training transformed feature vector and the second training transformed feature vector; and
    accessing an unstructured data file, wherein the unstructured data file identifies an occurrence of a particular transaction;
    accessing contextual data associated with the unstructured data file, wherein the contextual data includes information that describes an environment at which the particular transaction occurred and comprises user profile data of an entity involved in the particular transaction and information from data records reporting the particular transaction; wherein the contextual data is generated by applying one or more pre-processing operations to merge the user profile data and the information from data records reporting the particular transaction;

generating an event-data input element for the unstructured data file, wherein the event-data input element includes a set of feature vectors, and wherein the event-data input element is generated by:
    generating a first feature vector of the set of feature vectors by using the first encoder as tuned to process the unstructured data file, wherein the first feature vector represents the unstructured data file in the first feature space;
    generating a second feature vector of the set of feature vectors by using the second encoder as tuned to process the contextual data, wherein the second feature vector represents the contextual data in the second feature space;
    generating a vector in the shared feature space based on the first feature vector and the second feature vector, wherein the generating comprises combining information from the first feature vector and the second feature vector to result in the vector with improved projected predictiveness over either the first feature vector or the second feature vector in isolation;

generating a classification result of the unstructured data file by using a machine-learning model to process the event-data input element, wherein the classification result includes a prediction of whether the particular transaction corresponds to an anomalous transaction; and based at least in part on the classification result predicting the particular transaction corresponds to an anomalous transaction, determining to reject the particular transaction.

2. The method of claim 1, further comprising:
    determining that the first feature vector or the second feature vector deviates from an expected vector value;
    in response to determining that the first feature vector or the second feature vector deviates from the expected vector value, receiving feedback data associated with the contextual data, wherein generating the classification result further includes processing the feedback data using the machine-learning model.

3. The method of claim 1, wherein the first encoder was trained using a set of training unstructured data files, wherein training of the first encoder includes:
    augmenting a training unstructured data file of the set of training unstructured data files to generate a first training augmented unstructured data file and a second training augmented unstructured data file;
    generating a third training feature vector of the first training augmented unstructured data file in the first feature space;
    generating a fourth training feature vector of the second training augmented unstructured data file in the first feature space;
    determining a loss between the third training feature vector and the fourth training feature vector; and
    adjusting one or more parameters of the first encoder based on the determined loss.

4. The method of claim 1, wherein the second encoder was trained using a set of training contextual-data objects, wherein training of the second encoder includes:

augmenting a training contextual-data object of the set of training contextual-data objects to generate a first training augmented contextual-data object and a second training augmented contextual-data object;

generating a fifth training feature vector of the first training augmented contextual-data object in the second feature space;

generating a sixth training feature vector of the second training augmented contextual-data object in the second feature space;

determining a loss between the fifth training feature vector and the sixth training feature vector; and adjusting one or more parameters of the second encoder based on the determined loss.

5. The method of claim 1, wherein the first encoder includes a convolutional neural network.

6. The method of claim 1, wherein the machine-learning model includes a tree-based classifier.

7. The method of claim 1, wherein the contextual data includes a first set of data records accessed from a first user profile data store and a second set of data records accessed from a second transaction report data store.

8. The method of claim 1, wherein the classification result further includes a severity score of the particular transaction, wherein the severity score is predictive of whether the particular transaction corresponds to a particular type of the anomalous transaction.

9. The method of claim 1, further comprising extracting text from the unstructured data file using optical character recognition, and determining overlapping data between the first feature vector and the second feature vector based at least in part on the extracted text.

10. A non-transitory machine-readable storage medium storing instructions configured to cause one or more data processors to perform operations including:

tuning a first encoder to process unstructured data files by determining one or more first parameters of the first encoder and tuning a second encoder to process contextual data items by determining one or more second parameters of the second encoder at least in part by:

transforming a first training feature vector generated by the first encoder in a first feature space to generate a first training transformed feature vector that represents a training unstructured data file in a shared feature space, wherein the training unstructured data file identifies a training event;

transforming a second training feature vector generated by the second encoder in a second feature space to generate a second training transformed feature vector that represents a training contextual data in the shared feature space, wherein the training contextual data identifies the same training event as the training unstructured data file;

determining, using a contrastive loss function, a contrastive loss in the shared feature space between the first training transformed feature vector and the second training transformed feature vector; and accessing an unstructured data file, wherein the unstructured data file identifies an occurrence of a particular transaction;

accessing contextual data associated with the unstructured data file, wherein the contextual data includes information that describes an environment at which the particular transaction occurred and comprises user profile data of an entity involved in the particular transaction and information from data records reporting the particular transaction; wherein the contextual data is generated by applying one or more pre-processing operations to merge the user profile data and the information from data records reporting the particular transaction;

generating an event-data input element for the unstructured data file, wherein the event-data input element includes a set of feature vectors, and wherein the event-data input element is generated by:

generating a first feature vector of the set of feature vectors by using the first encoder as tuned to process the unstructured data file, wherein the first feature vector represents the unstructured data file in the first feature space;

generating a second feature vector of the set of feature vectors by using the second encoder as tuned to process the contextual data, wherein the second feature vector represents the contextual data in the second feature space;

generating a vector in the shared feature space based on the first feature vector and the second feature vector, wherein the generating comprises combining information from the first feature vector and the second feature vector to result in the vector with improved projected predictiveness over either the first feature vector or the second feature vector in isolation;

generating a classification result of the unstructured data file by using a machine-learning model to process the event-data input element, wherein the classification result includes a prediction of whether the particular transaction corresponds to an anomalous transaction; and based at least in part on the classification result predicting the particular transaction corresponds to an anomalous transaction, determining to reject the particular transaction.

11. The non-transitory machine-readable storage medium of claim 10, wherein the instructions further cause one or more data processors to perform operations including:

determining that the first feature vector or the second feature vector deviates from an expected vector value;

in response to determining that the first feature vector or the second feature vector deviates from the expected vector value, receiving feedback data associated with the contextual data, wherein generating the classification result further includes processing the feedback data using the machine-learning model.

12. The non-transitory machine-readable storage medium of claim 10, wherein the first encoder was trained using a set of training unstructured data files, wherein training of the first encoder includes:

augmenting a training unstructured data file of the set of training unstructured data files to generate a first training augmented unstructured data file and a second training augmented unstructured data file;

generating a third training feature vector of the first training augmented unstructured data file in the first feature space;

generating a fourth training feature vector of the second training augmented unstructured data file in the first feature space;

determining a loss between the third training feature vector and the fourth training feature vector; and adjusting one or more parameters of the first encoder based on the determined loss.

13. The non-transitory machine-readable storage medium of claim 10, wherein the second encoder was trained using a set of training contextual-data objects, wherein training of the second encoder includes:

augmenting a training contextual-data object of the set of training contextual-data objects to generate a first training augmented contextual-data object and a second training augmented contextual-data object;

generating a fifth training feature vector of the first training augmented contextual-data object in the second feature space;

generating a sixth training feature vector of the second training augmented contextual-data object in the second feature space;

determining a loss between the fifth training feature vector and the sixth training feature vector; and adjusting one or more parameters of the second encoder based on the determined loss.

14. The non-transitory machine-readable storage medium of claim 10, wherein the first encoder includes a convolutional neural network.

15. The non-transitory machine-readable storage medium of claim 10, wherein the classification result further includes a severity score of the particular transaction, wherein the severity score is predictive of whether the particular event corresponds to a particular type of the anomalous transaction.

16. The non-transitory machine-readable storage medium of claim 10, wherein the instructions further cause one or more data processors to perform operations including extracting text from the unstructured data file using optical character recognition, and determining overlapping data between the first feature vector and the second feature vector based at least in part on the extracted text.

17. The non-transitory machine-readable storage medium of claim 10, wherein the contextual data includes a first set of data records accessed from a first user profile data store and a second set of data records accessed from a second transaction report data store.

18. A system comprising:

one or more data processors; and a non-transitory computer readable storage medium containing instructions which, when executed on the one or more data processors, cause the one or more data processors to perform operations including:

tuning a first encoder to process unstructured data files by determining one or more first parameters of the first encoder and tuning a second encoder to process contextual data items by determining one or more second parameters of the second encoder at least in part by:

transforming a first training feature vector generated by the first encoder in a first feature space to generate a first training transformed feature vector that represents a training unstructured data file in a shared feature space, wherein the training unstructured data file identifies a training event;

transforming a second training feature vector generated by the second encoder in a second feature space to generate a second training transformed feature vector that represents a training contextual data in the shared feature space, wherein the training contextual data identifies the same training event as the training unstructured data file;

determining, using a contrastive loss function, a contrastive loss in the shared feature space between the first training transformed feature vector and the second training transformed feature vector; and accessing an unstructured data file, wherein the unstructured data file identifies an occurrence of a particular transaction;

accessing contextual data associated with the unstructured data file, wherein the contextual data includes information that describes an environment at which the particular transaction occurred and comprises user profile data of an entity involved in the particular transaction and information from data records reporting the particular transaction; wherein the contextual data is generated by applying one or more pre-processing operations to merge the user profile data and the information from data records reporting the particular transaction;

generating an event-data input element for the unstructured data file, wherein the event-data input element includes a set of feature vectors, and wherein the event-data input element is generated by:

generating a first feature vector of the set of feature vectors by using the first encoder as tuned to process the unstructured data file, wherein the first feature vector represents the unstructured data file in the first feature space;

generating a second feature vector of the set of feature vectors by using the second encoder as tuned to process the contextual data, wherein the second feature vector represents the contextual data in the second feature space;

generating a vector in the shared feature space based on the first feature vector and the second feature vector, wherein the generating comprises combining information from the first feature vector and the second feature vector to result in the vector with improved projected predictiveness over either the first feature vector or the second feature vector in isolation;

generating a classification result of the unstructured data file by using a machine-learning model to process the event-data input element, wherein the classification result includes a prediction of whether the particular transaction corresponds to an anomalous transaction; and based at least in part on the classification result predicting the particular transaction corresponds to an anomalous transaction, determining to reject the particular transaction.

19. The system of claim 18, wherein the instructions further cause one or more data processors to perform operations including:

determining that the first feature vector or the second feature vector deviates from an expected vector value;

in response to determining that the first feature vector or the second feature vector deviates from the expected vector value, receiving feedback data associated with the contextual data, wherein generating the classification result further includes processing the feedback data using the machine-learning model.

20. The system of claim 18, wherein the first encoder was trained using a set of training unstructured data files, wherein training of the first encoder includes:

augmenting a training unstructured data file of the set of training unstructured data files to generate a first training augmented unstructured data file and a second training augmented unstructured data file;

generating a third training feature vector of the first training augmented unstructured data file in the first feature space;

generating a fourth training feature vector of the second training augmented unstructured data file in the first feature space;

determining a loss between the third training feature vector and the fourth training feature vector; and adjusting one or more parameters of the first encoder based on the determined loss.

21. The system of claim 18, wherein the second encoder was trained using a set of training contextual-data objects, wherein training of the second encoder includes:

augmenting a training contextual-data object of the set of training contextual-data objects to generate a first training augmented contextual-data object and a second training augmented contextual-data object;

generating a fifth training feature vector of the first training augmented contextual-data object in the second feature space;

generating a sixth training feature vector of the second training augmented contextual-data object in the second feature space;

determining a loss between the fifth training feature vector and the sixth training feature vector; and adjusting one or more parameters of the second encoder based on the determined loss.

22. The system of claim 18, wherein the first encoder includes a convolutional neural network.

23. The system of claim 18, wherein the classification result further includes a severity score of the particular transaction, wherein the severity score is predictive of whether the particular transaction corresponds to a particular type of the anomalous transaction.

24. The system of claim 18, wherein the instructions further cause one or more data processors to perform operations including extracting text from the unstructured data file using optical character recognition, and determining overlapping data between the first feature vector and the second feature vector based at least in part on the extracted text.

25. The system of claim 18, wherein the contextual data includes a first set of data records accessed from a first user profile data store and a second set of data records accessed from a second transaction report data store.

* * * * *